US012781566B2

(12) United States Patent
O'Keeffe

(10) Patent No.: US 12,781,566 B2
(45) Date of Patent: Nov. 3, 2026

(54) LIGHT-MODULATING ELECTROPHORETIC DEVICE

(71) Applicant: E INK CORPORATION, Billerica, MA (US)

(72) Inventor: Donal Martin O'Keeffe, Parteen (IE)

(73) Assignee: E Ink Corporation, Billerica, MA (US)

( * ) Notice: Subject to any disclaimer, the term of this patent is extended or adjusted under 35 U.S.C. 154(b) by 171 days.

(21) Appl. No.: 19/018,679

(22) Filed: Jan. 13, 2025

(65) Prior Publication Data

US 2025/0146355 A1 May 8, 2025

Related U.S. Application Data

(63) Continuation of application No. 18/651,608, filed on Apr. 30, 2024, now Pat. No. 12,305,444, which is a continuation of application No. 18/203,968, filed on May 31, 2023, now Pat. No. 12,000,207, which is a continuation of application No. 17/502,415, filed on (Continued)

(30) Foreign Application Priority Data

Oct. 22, 2013 (GB) ..................................... 1318614
Nov. 12, 2013 (GB) ..................................... 1319945

(51) Int. Cl.
*E06B 9/24* (2006.01)
*G02F 1/167* (2019.01)
*G02F 1/1675* (2019.01)

(52) U.S. Cl.
CPC ................ *E06B 9/24* (2013.01); *G02F 1/167* (2013.01); *G02F 1/1675* (2019.01); *E06B 2009/2464* (2013.01); *G02F 2001/1678* (2013.01)

(58) Field of Classification Search
CPC ............... E06B 9/24; E06B 2009/2464; G02F 1/1675; G02F 1/167; G02F 2001/1678
See application file for complete search history.

(56) References Cited

U.S. PATENT DOCUMENTS 4,298,448 A 11/1981 Muller et al.
4,418,346 A 11/1983 Batchelder
(Continued)

FOREIGN PATENT DOCUMENTS

CN 1828350 A 9/2006
CN 103834285 A 6/2014
(Continued)

OTHER PUBLICATIONS

Kitamura, T et al., "Electrical toner movement for electronic paper-like display", Asia Display/IDW '01, pp. 1517-1520, Paper HCS1-1 (2001).

(Continued)

*Primary Examiner* — Bumsuk Won
*Assistant Examiner* — Grant A Gagnon
(74) *Attorney, Agent, or Firm* — Brian D. Bean

(57) ABSTRACT

A variable light transmittance sheet comprises a first transparent electrode and a second transparent electrode spaced apart from the first electrode, and between the electrodes an electrophoretic cell containing an electrophoretic ink and one or more non-planar solid polymer elements. In an embodiment, the electrophoretic ink includes charged particles in a suspending fluid, and 75% or more by mass of the suspending fluid is an organosilicone or an aliphatic hydrocarbon and the solid polymer is a fluorinated elastomeric polymer.

6 Claims, 2 Drawing Sheets

Related U.S. Application Data

Oct. 15, 2021, now Pat. No. 11,708,720, which is a continuation of application No. 16/438,515, filed on Jun. 12, 2019, now Pat. No. 11,156,893, which is a continuation of application No. 15/027,480, filed as application No. PCT/EP2014/072241 on Oct. 16, 2014, now Pat. No. 10,324,353.

(56) References Cited

U.S. PATENT DOCUMENTS

| | | | |
|---|---|---|---|
| 5,115,346 | A | 5/1992 | Lynam |
| 5,285,517 | A | 2/1994 | Wu |
| 5,784,136 | A | 7/1998 | Ando et al. |
| 5,872,552 | A | 2/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,067,185 | A | 5/2000 | Albert et al. |
| 6,120,588 | A | 9/2000 | Jacobson |
| 6,120,839 | A | 9/2000 | Comiskey et al. |
| 6,130,774 | A | 10/2000 | Albert et al. |
| 6,144,361 | A | 11/2000 | Gordon, II et al. |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,323,989 | B1 | 11/2001 | Jacobson et al. |
| 6,327,072 | B1 | 12/2001 | Comiskey et al. |
| 6,377,387 | B1 | 4/2002 | Duthaler et al. |
| 6,392,786 | B1 | 5/2002 | Albert |
| 6,410,213 | B1 | 6/2002 | Raguin et al. |
| 6,459,418 | B1 | 10/2002 | Comiskey et al. |
| 6,515,649 | B1 | 2/2003 | Albert et al. |
| 6,538,801 | B2 | 3/2003 | Jacobson et al. |
| 6,580,545 | B2 | 6/2003 | Morrison et al. |
| 6,623,662 | B2 | 9/2003 | Wang et al. |
| 6,677,926 | B2 | 1/2004 | Biegelsen |
| 6,693,620 | B1 | 2/2004 | Herb et al. |
| 6,721,083 | B2 | 4/2004 | Jacobson et al. |
| 6,727,881 | B1 | 4/2004 | Albert et al. |
| 6,822,782 | B2 | 11/2004 | Honeyman et al. |
| 6,831,771 | B2 | 12/2004 | Ho et al. |
| 6,839,158 | B2 | 1/2005 | Albert et al. |
| 6,866,760 | B2 | 3/2005 | Paolini, Jr. et al. |
| 6,870,661 | B2 | 3/2005 | Pullen et al. |
| 6,900,923 | B2 | 5/2005 | Chakrapani et al. |
| 6,914,713 | B2 | 7/2005 | Chung et al. |
| 6,922,276 | B2 | 7/2005 | Zhang et al. |
| 6,927,892 | B2 | 8/2005 | Ho et al. |
| 6,934,067 | B2 | 8/2005 | Ash et al. |
| 6,950,220 | B2 | 9/2005 | Abramson et al. |
| 6,956,690 | B2 | 10/2005 | Yu et al. |
| 6,958,848 | B2 | 10/2005 | Cao et al. |
| 6,958,849 | B2 | 10/2005 | Chen et al. |
| 6,982,178 | B2 | 1/2006 | LeCain et al. |
| 6,987,603 | B2 | 1/2006 | Paolini, Jr. et al. |
| 7,002,728 | B2 | 2/2006 | Pullen et al. |
| 7,002,758 | B2 | 2/2006 | Uno et al. |
| 7,012,600 | B2 | 3/2006 | Zehner et al. |
| 7,012,735 | B2 | 3/2006 | Honeyman |
| 7,038,655 | B2 | 5/2006 | Herb et al. |
| 7,052,766 | B2 | 5/2006 | Zang et al. |
| 7,072,095 | B2 | 7/2006 | Liang et al. |
| 7,075,502 | B1 | 7/2006 | Drzaic et al. |
| 7,110,162 | B2 | 9/2006 | Wu et al. |
| 7,110,164 | B2 | 9/2006 | Paolini, Jr. et al. |
| 7,113,323 | B2 | 9/2006 | Ho et al. |
| 7,116,318 | B2 | 10/2006 | Amundson et al. |
| 7,116,466 | B2 | 10/2006 | Whitesides et al. |
| 7,141,688 | B2 | 11/2006 | Feng et al. |
| 7,142,351 | B2 | 11/2006 | Chung et al. |
| 7,144,942 | B2 | 12/2006 | Zang et al. |
| 7,170,670 | B2 | 1/2007 | Webber |
| 7,184,197 | B2 | 2/2007 | Liang et al. |
| 7,202,991 | B2 | 4/2007 | Zhang et al. |
| 7,224,511 | B2 | 5/2007 | Takagi |
| 7,226,550 | B2 | 6/2007 | Hou et al. |
| 7,226,966 | B2 | 6/2007 | Kambe et al. |
| 7,230,750 | B2 | 6/2007 | Whitesides et al. |
| 7,230,751 | B2 | 6/2007 | Whitesides et al. |
| 7,236,290 | B1 | 6/2007 | Zhang et al. |
| 7,236,291 | B2 | 6/2007 | Kaga et al. |
| 7,256,766 | B2 | 8/2007 | Albert et al. |
| 7,277,218 | B2 | 10/2007 | Hwang et al. |
| 7,286,279 | B2 | 10/2007 | Yu et al. |
| 7,304,634 | B2 | 12/2007 | Albert et al. |
| 7,307,779 | B1 | 12/2007 | Cernasov |
| 7,312,784 | B2 | 12/2007 | Baucom et al. |
| 7,312,916 | B2 | 12/2007 | Pullen et al. |
| 7,319,554 | B1 | 1/2008 | Abe et al. |
| 7,321,459 | B2 | 1/2008 | Masuda et al. |
| 7,327,511 | B2 | 2/2008 | Whitesides et al. |
| 7,339,715 | B2 | 3/2008 | Webber et al. |
| 7,382,514 | B2 | 6/2008 | Hsu et al. |
| 7,387,858 | B2 | 6/2008 | Chari et al. |
| 7,390,901 | B2 | 6/2008 | Yang et al. |
| 7,405,865 | B2 | 7/2008 | Ogiwara et al. |
| 7,411,719 | B2 | 8/2008 | Paolini, Jr. et al. |
| 7,417,787 | B2 | 8/2008 | Chopra et al. |
| 7,420,549 | B2 | 9/2008 | Jacobson et al. |
| 7,432,907 | B2 | 10/2008 | Goden |
| 7,453,445 | B2 | 11/2008 | Amundson |
| 7,465,208 | B2 | 12/2008 | Hiji et al. |
| 7,470,386 | B2 | 12/2008 | Kang et al. |
| 7,473,782 | B2 | 1/2009 | Yang et al. |
| 7,477,444 | B2 | 1/2009 | Cao et al. |
| 7,507,449 | B2 | 3/2009 | Chari et al. |
| 7,535,624 | B2 | 5/2009 | Amundson et al. |
| 7,542,635 | B2 | 6/2009 | Coleman |
| 7,560,004 | B2 | 7/2009 | Pereira et al. |
| 7,561,324 | B2 | 7/2009 | Duthaler et al. |
| 7,572,394 | B2 | 8/2009 | Gu et al. |
| 7,575,847 | B2 | 8/2009 | Jing et al. |
| 7,576,904 | B2 | 8/2009 | Chung et al. |
| 7,580,180 | B2 | 8/2009 | Ho et al. |
| 7,580,181 | B2 | 8/2009 | Ohshima et al. |
| 7,679,814 | B2 | 3/2010 | Paolini, Jr. et al. |
| 7,715,088 | B2 | 5/2010 | Liang et al. |
| 7,824,516 | B2 | 11/2010 | Amos et al. |
| 7,839,564 | B2 | 11/2010 | Whitesides et al. |
| 7,848,006 | B2 | 12/2010 | Wilcox et al. |
| 7,903,319 | B2 | 3/2011 | Honeyman et al. |
| 7,910,175 | B2 | 3/2011 | Webber |
| 7,929,198 | B2 | 4/2011 | Lipovetskaya et al. |
| 7,951,938 | B2 | 5/2011 | Yang et al. |
| 7,952,790 | B2 | 5/2011 | Honeyman et al. |
| 7,952,809 | B2 | 5/2011 | Takai |
| 7,957,054 | B1 | 6/2011 | Yeo et al. |
| 7,999,787 | B2 | 8/2011 | Amundson et al. |
| 8,008,172 | B2 | 8/2011 | Lim et al. |
| 8,009,348 | B2 | 8/2011 | Zehner et al. |
| 8,018,640 | B2 | 9/2011 | Whitesides et al. |
| 8,018,642 | B2 | 9/2011 | Yeo et al. |
| 8,035,886 | B2 | 10/2011 | Jacobson |
| 8,089,687 | B2 | 1/2012 | Mabeek et al. |
| 8,115,729 | B2 | 2/2012 | Danner et al. |
| 8,119,802 | B2 | 2/2012 | Moonen et al. |
| 8,129,655 | B2 | 3/2012 | Jacobson et al. |
| 8,158,728 | B2 | 4/2012 | DeSimone et al. |
| 8,174,755 | B2 | 5/2012 | Yamamoto et al. |
| 8,183,757 | B2 | 5/2012 | Mabeck et al. |
| 8,184,357 | B2 | 5/2012 | Yeo et al. |
| 8,257,614 | B2 | 9/2012 | Gu et al. |
| 8,270,064 | B2 | 9/2012 | Feick et al. |
| 8,305,341 | B2 | 11/2012 | Arango et al. |
| 8,319,759 | B2 | 11/2012 | Jacobson et al. |
| 8,331,016 | B2 | 12/2012 | Shitagami et al. |
| 8,363,306 | B2 | 1/2013 | Du et al. |
| 8,384,659 | B2 | 2/2013 | Yeo et al. |
| 8,390,918 | B2 | 3/2013 | Wilcox et al. |
| 8,446,664 | B2 | 5/2013 | Chen et al. |

(56) References Cited

U.S. PATENT DOCUMENTS

| | | | |
|---|---|---|---|
| 8,508,695 | B2 | 8/2013 | O'Keeffe |
| 8,564,874 | B2 | 10/2013 | Chen |
| 8,582,196 | B2 | 11/2013 | Walls et al. |
| 8,654,436 | B1 | 2/2014 | Feick |
| 8,670,174 | B2 | 3/2014 | Sprague et al. |
| 8,810,895 | B2 | 8/2014 | No et al. |
| 8,837,032 | B2 | 9/2014 | Lam et al. |
| 8,854,714 | B2 | 10/2014 | Clapp et al. |
| 8,902,491 | B2 | 12/2014 | Wang et al. |
| 8,906,998 | B2 | 12/2014 | Farrand et al. |
| 8,961,831 | B2 | 2/2015 | Du et al. |
| 9,052,564 | B2 | 6/2015 | Sprague et al. |
| 9,279,906 | B2 | 3/2016 | Kang |
| 9,335,539 | B2 | 5/2016 | Shian et al. |
| 9,341,915 | B2 | 5/2016 | Yang et al. |
| 9,348,193 | B2 | 5/2016 | Hiji et al. |
| 9,361,836 | B1 | 6/2016 | Telfer et al. |
| 9,366,935 | B2 | 6/2016 | Du et al. |
| 9,372,380 | B2 | 6/2016 | Du et al. |
| 9,382,427 | B2 | 7/2016 | Du et al. |
| 9,423,666 | B2 | 8/2016 | Wang et al. |
| 9,428,649 | B2 | 8/2016 | Li et al. |
| 9,557,623 | B2 | 1/2017 | Wang et al. |
| 9,645,467 | B2 | 5/2017 | Yokokawa et al. |
| 9,658,373 | B2 | 5/2017 | Downing |
| 9,664,978 | B2 | 5/2017 | Arango et al. |
| 9,670,367 | B2 | 6/2017 | Li et al. |
| 9,688,859 | B2 | 6/2017 | Yezek et al. |
| 9,726,957 | B2 | 8/2017 | Telfer et al. |
| 9,777,201 | B2 | 10/2017 | Widger et al. |
| 9,778,537 | B2 | 10/2017 | Wang et al. |
| 9,835,926 | B2 | 12/2017 | Sprague et al. |
| 9,921,451 | B2 | 3/2018 | Telfer et al. |
| 10,067,398 | B2 | 9/2018 | O'Keeffe |
| 10,324,353 | B2 | 6/2019 | O'Keeffe |
| 10,372,008 | B2 | 8/2019 | Telfer et al. |
| 10,509,242 | B2 | 12/2019 | O'Keeffe |
| 10,656,493 | B2 | 5/2020 | Heikenfeld et al. |
| 10,761,395 | B2 | 9/2020 | Du et al. |
| 10,809,590 | B2 | 10/2020 | Widger et al. |
| 10,824,025 | B2 | 11/2020 | O'Keeffe |
| 10,983,410 | B2 | 4/2021 | Widger et al. |
| 11,098,206 | B2 | 8/2021 | Wu et al. |
| 2003/0048522 | A1 | 3/2003 | Liang et al. |
| 2003/0151029 | A1 | 8/2003 | Hsu et al. |
| 2003/0164480 | A1 | 9/2003 | Wu et al. |
| 2004/0030125 | A1 | 2/2004 | Li et al. |
| 2005/0012980 | A1 | 1/2005 | Wilcox et al. |
| 2005/0156340 | A1 | 7/2005 | Valianatos et al. |
| 2006/0284794 | A1 | 12/2006 | Johnson et al. |
| 2007/0091417 | A1 | 4/2007 | Cao et al. |
| 2009/0009852 | A1 | 1/2009 | Honeyman et al. |
| 2009/0122389 | A1 | 5/2009 | Whitesides et al. |
| 2009/0153942 | A1 | 6/2009 | Daniel et al. |
| 2010/0148385 | A1 | 6/2010 | Balko et al. |
| 2011/0217639 | A1 | 9/2011 | Sprague |
| 2012/0049125 | A1 | 3/2012 | Du et al. |
| 2012/0118198 | A1 | 5/2012 | Zhou et al. |
| 2013/0161565 | A1 | 6/2013 | Laxton |
| 2013/0193385 | A1 | 8/2013 | Li et al. |
| 2013/0244149 | A1 | 9/2013 | Wang et al. |
| 2014/0011913 | A1 | 1/2014 | Du et al. |
| 2014/0078024 | A1 | 3/2014 | Paolini, Jr. et al. |
| 2014/0078576 | A1 | 3/2014 | Sprague |
| 2014/0078857 | A1 | 3/2014 | Nelson et al. |
| 2014/0104674 | A1 | 4/2014 | Ting et al. |
| 2014/0231728 | A1 | 8/2014 | Du et al. |
| 2015/0177590 | A1 | 6/2015 | Laxton |
| 2015/0185509 | A1 | 7/2015 | Wang et al. |
| 2015/0277205 | A1 | 10/2015 | Kawahara et al. |
| 2015/0301425 | A1 | 10/2015 | Du et al. |
| 2016/0170106 | A1 | 6/2016 | Wang et al. |
| 2018/0031942 | A1 | 2/2018 | Koch et al. |

FOREIGN PATENT DOCUMENTS

| | | | |
|---|---|---|---|
| EP | 2998786 | A1 | 3/2016 |
| JP | 2003222913 | A | 8/2003 |
| JP | 2004163818 | A | 6/2004 |
| KR | 20130078094 | A | 7/2013 |
| KR | 20160052092 | A | 5/2016 |
| WO | 1999010767 | A1 | 3/1999 |
| WO | 2006108285 | A1 | 10/2006 |
| WO | 2012076884 | A1 | 6/2012 |
| WO | 2013110564 | A1 | 8/2013 |
| WO | 2014191234 | A1 | 12/2014 |
| WO | 2019021578 | A1 | 1/2019 |

OTHER PUBLICATIONS

Yamaguchi, Y. et al., "Toner display using insulative particles charged triboelectrically", Asia Display/IDW '01, pp. 1729-1730, Paper AMD4-4 (2001).

Zehner, R. et al., "Drive Waveforms for Active Matrix Electrophoretic Displays", SID 03 Digest, pp. 842-845 (2003).

Wang, D.W. et al., "Microencapsulated electric ink using gelatin/gum arabic", Journal of Microencapsulation, vol. 26:1, pp. 37-45, (2009).

Aizenberg, Joanna et al., "Patterned Colloidal Deposition Controlled by Electrostatic and Capillary Forces", Phys. Rev. Lett., vol. 84, Issue 13, p. 2997, (2000).

Schneider, Tod et al., "50.4: Flexible Encapsulated Cholesteric LCDs by Polymerization Induced Phase Separation", SID Symposium Digest of Technical Papers, vol. 36, Issue 1, pp. 1568-1571, (2005).

Hansen, Charles C., "Hansen Solubility Parameters; A User's Handbook", Second Edition, CRC Press, Boca Raton, Florida (2007).

European Patent Office, "International Search Report and Written Opinion", PCT/EP2014/072241, Jan. 14, 2015.

LIGHT-MODULATING ELECTROPHORETIC DEVICE

CROSS-REFERENCE TO RELATED APPLICATIONS

This application is a continuation of U.S. patent application Ser. No. 18/651,608, filed Apr. 30, 2024, which is a continuation of U.S. patent application Ser. No. 18/203,968, filed May 31, 2023, now U.S. Pat. No. 12,000,207, which is a continuation of U.S. patent application Ser. No. 17/502,415, filed Oct. 15, 2021, now U.S. Pat. No. 11,708,720, which is a continuation of U.S. patent application Ser. No. 16/438,515, filed Jun. 12, 2019, now U.S. Pat. No. 11,156,893, which is a continuation of application Ser. No. 15/027,480, filed Apr. 6, 2016, now U.S. Pat. No. 10,324,353, which is a 35 USC 371 national phase filing of International Patent Application No. PCT/EP2014/072241, filed Oct. 16, 2014, which claims priority to United Kingdom Patent Application No. 1318614.3, filed Oct. 22, 2013, and United Kingdom Patent Application No. 1319945.0, filed Nov. 12, 2013. The disclosures of all patents and publications disclosed herein are incorporated by reference in their entireties.

This application further relates to Irish Patent Application No. S2013/0104 titled "An Electrophoretic Device Having a Transparent Light State" filed on 22 Mar. 2013, the disclosure of which is incorporated herein by reference in its entirety.

FIELD OF THE INVENTION

The present invention relates to an electrophoretic device for use over a wide operating temperature range.

BACKGROUND OF THE INVENTION

There is a need for an electro-optical device that in one or more light states is transparent to visible light and in other light states attenuates light. Applications for such a device include use as a light attenuator in a smart glass, use as a see-through display, or use as a sunlight-readable, reflective display. By controlling light transmittance in windows, glass facades or roof systems, functions including see-through (i.e. transparent), privacy (opaque), electronically-variable tinting or dimming, or black-out can be provided. In display devices functionality can be extended into new areas such as providing see-through (i.e. transparent) displays and providing large-format, sunlight-readable, reflective displays for outdoor applications.

There is a need for an electrophoretic device to operate over the wide temperature range encountered outdoors in a geographic location (i.e. a local areas' climate). An insulated glass unit (IGU) that incorporates a laminated electrophoretic device in its outer pane exposes the device to approximately outdoor temperatures. Furthermore, an IGU incorporated device is exposed to sunlight and requires the necessary photostability (i.e., weatherability).

At ground level in hot climates the energy level in the three sunlight spectrums per square meter with the sun at its zenith is about 32 watts (3%) of UV, 445 watts (44%) of visible, and 527 watts (53%) of infrared, or about 1,004 watts total. In general, the prior art of smart glass and outdoor displays does not describe what happens this solar energy when it is absorbed by light states, and is largely silent with respect to operating at elevated temperature due to heat build-up within a device that absorbs incident solar energy.

The problems an electrophoretic device encounters due to use at elevated temperature include significantly increased haze with respect to a normative (i.e. reference) ambient temperature, and significantly increased ability of the suspending fluid to dissolve/solubilize or swell polymer elements within the electrophoretic cell and in contact with the fluid (e.g., non-planar polymer structures and charged particles). The haze problem is proportional to temperature and reversible. An electrophoretic device having minimal haze (i.e. about 3% or less) at 20 degrees C. (the refractive index reference temperature) can develop a perceivable increase in haze from about 30 degrees C. and go on to become cloudy or translucent at about 70 degrees C. The polymer dissolution or swelling problem develops over time and using prior art devices/methods results in device failure over days or months depending on material selection and the total number of hours at elevated temperature. For example, in devices that use aliphatic hydrocarbons for the suspending fluid (e.g., the Isopar range from Exxon Mobil) the suspending fluid can become an effective solvent for a polymer at elevated temperature while being a non-solvent at room temperature. Furthermore, unless measures are taken to manage heat build-up in very hot climates the maximum continuous use temperature of a polymer can be exceeded leading to thermal degradation over time. For example, PMMA (i.e. polymethylmethacrylate) and most polyurethanes have a maximum continuous use temperature (also known as its service temperature) of about 90 degrees C. or less.

Very low operating temperature also causes significantly increased haze with respect to a normative operating temperature, and the suspending fluid viscosity can increase to multiples of its value at 20 degrees C. leading to unacceptably long switching times or failure to switch. In prior art devices that use linear aliphatic hydrocarbons for the suspending fluid, wax crystals can form in the fluid causing a cloudy or translucent appearance from about −10 degrees C. or lower.

In summary, there is a need for an electrophoretic device to remain haze-free (i.e. minimal haze) and operate reliably over the wide temperature range encountered outdoors in geographic areas intended for use. Furthermore, due to solar energy absorption in some light states, elevated temperature operation significantly higher than peak ambient temperature is required. The principle problems associated with prior art devices when operated over a wide temperature range and exposed to sunlight can include some or all of the following:

a) haze that increases in proportion to the temperature difference with a normative or reference temperature, and becomes perceivable from about 10 degrees Celsius difference or more;
b) polymer dissolution or swelling by the suspending fluid at elevated temperature over time;
c) thermal degradation over time if a polymer is subject to continuous use greater than its service temperature;
d) unacceptable long switching times or failure to switch at low ambient temperature;
e) suspending fluid crystallization at low ambient temperature; and,
f) sunlight induced photo degradation of polymer and suspending fluid materials over time.

SUMMARY OF THE INVENTION

In a first aspect an electrophoretic device comprises a first electrode and a second electrode spaced apart from said first electrode, and between said electrodes an electrophoretic cell containing an electrophoretic ink and one or more optically-transparent, non-planar, solid polymer elements, said ink including charged particles of at least one type suspended in an optically-transparent suspending fluid, the refractive indices of said solid polymer elements and said suspending fluid being matched to have a difference of less than 0.0075, and for half or more of the operating temperature range of said device, the thermo-optic coefficients (also known as the temperature coefficient of refractive index per Kelvin or the differential of refractive index with respect to temperature dn/dT) of the solid polymer elements and the suspending fluid are matched to have an arithmetic-mean difference of less than 0.0002/K in magnitude.

In a second aspect an electrophoretic device comprises a first electrode and a second electrode spaced apart from said first electrode, and between said electrodes an electrophoretic cell containing an electrophoretic ink and one or more optically-transparent, non-planar, solid polymer elements, said ink including charged particles of at least one type suspended in an optically-transparent suspending fluid, the refractive indices of said solid polymer elements and said suspending fluid being matched to have a difference of less than 0.0075 at a reference temperature, and the chromatic dispersion of said non-planar, solid polymer elements and said suspending fluid being matched to be about or less than the minimum resolution of the eye, and expressing their chromatic dispersion in Abbe number $V_d$, both having a $V_d$ number greater than or equal to 39.

In a third aspect an electrophoretic device comprises a first electrode and a second electrode spaced apart from said first electrode, and between said electrodes an electrophoretic cell containing an electrophoretic ink and one or more optically-transparent, non-planar, solid polymer elements, said ink including charged particles of at least one type suspended in an optically-transparent suspending fluid, the refractive indices of said solid polymer elements and said suspending fluid being matched to have a difference of less than 0.0075, and, the matched refractive indices at 25 degrees Celsius and 589.3 nm of light (i.e. $n_{D25}$) are less than 1.460.

In a fourth aspect an electrophoretic device comprises a first electrode and a second electrode spaced apart from said first electrode, and between said electrodes an electrophoretic cell containing an electrophoretic ink and one or more non-planar solid polymer elements, said ink including charged particles of at least one type suspended in a suspending fluid, and, 75% or more by mass of said suspending fluid is an organosilicone or an aliphatic hydrocarbon and said solid polymer is a fluorinated elastomeric polymer.

In embodiments said non-planar, solid polymer element is an elastomer and has a glass transition temperature (i.e. $T_g$) less than 20 degrees Celsius (i.e. 293K) and has crosslinks.

In embodiments said charged particles move position (i.e. translate) in said suspending fluid in response to an electric field applied using said electrodes.

In embodiments said charged particles are responsive to an electric field applied to said electrophoretic device to move between: a first extreme light state in which particles are maximally spread within said cell to lie in the path of sunlight through the cell and to strongly attenuate light transmitted through the cell, and a second extreme light state in which said particles are maximally concentrated within the cell to remove them from the path of sunlight through the cell and to substantially transmit light through the cell.

In embodiments the matched thermo-optic coefficients are both negative and have a magnitude greater than $2.25\times10^{-4}$/K, and preferably greater than $3.0\times10^{-4}$/K, and most preferably greater than $3.25\times10^{-4}$/K.

In some embodiments said thermo-optic coefficients match has an arithmetic-mean difference of less than 0.000125/K in magnitude, and more preferably less than 0.0001/K, and most preferably less than 0.000075/K.

In some embodiments said thermo-optic coefficients match is over the entire operating temperature range.

In some embodiments said glass transition temperature (i.e. $T_g$) is lower than the lowest operating temperature of said electrophoretic device, and preferably less than zero degrees Celsius (i.e. 273K), more preferably less than −10 degrees Celsius (i.e. 263K), even more preferably less than −20 degrees Celsius (i.e. 253K), and most preferably less than −40 degrees Celsius (i.e. 233K).

In embodiments said thermo-optic coefficient of said elastomeric, solid polymer closely matches said suspending fluid through selection of its crosslink density (i.e. in said elastomers dn/dT is proportional to crosslink density or degree or level).

In embodiments said suspending fluid is in contact with one or more of said non-planar, solid polymer elements, and said solid polymer resists swelling by said suspending fluid, swelling by less than 15% over the operating temperature range of said device, and preferably by less than 10%, and more preferably by less than 5%, and even more preferably by less than 2%, and most preferably by less than 1%.

In some embodiments the chromatic dispersion of said elastomeric, non-planar, solid polymer element and said suspending fluid are minimized and (using their Abbe number $V_d$ as a measure of chromatic dispersion) their $V_d$ numbers are preferably greater than 42, and most preferably greater than 43.

In some embodiments the Abbe number of one or both materials (i.e. solid polymer or suspending fluid) can be less than the eye's chromatic dispersion resolving limit and in these embodiments the material with the lowest Abbe number is matched to have a difference of less than 8, and more preferably less than 5, and most preferably less than 3, with respect to the lessor of the other material's $V_d$ or the eye's minimum resolving $V_d$.

In embodiments the aromatic (i.e. aryl) content of said non-planar, solid polymer and said suspending fluid pair is minimized in order to maximize said Abbe number for each material.

In embodiments said aromatic content is minimized or avoided in devices that reduce the refractive index of the non-planar, solid polymer to index match a low-index suspending fluid having little or no aromatic content (including alkanes and silicone fluids).

In embodiments the limits of allowable chromatic dispersion (i.e. a material's minimum Abbe number) take into account the photopic response (or luminosity function) of the eye.

In embodiments the operating temperature range spans at least 30 degrees Celsius, and preferably permits operation from 0 degrees Celsius to 70 degrees Celsius (the latter to allow for elevated temperature use in the event of significant heat build-up due to solar energy absorption in hot climates), and more preferably, from −10 degrees Celsius to 70 degrees Celsius, even more preferably from −20 degrees Celsius to 85 degrees Celsius, and most preferably from −40 degrees Celsius to 100 degrees Celsius.

In embodiments said non-planar, solid polymer element is viscoelastic for temperatures greater than said glass transition temperature (and preferably over the operating temperature range of said device); and its Young's Modulus (i.e. E) is less than 50 MPa and its hardness (Shore A) is less than 90.

In some embodiments said refractive index match has a difference of less than 0.005, and more preferably less than 0.0035, and most preferably less than 0.002.

In some embodiments said refractive index match is at the midpoint of a temperature range, and is either the most-used range (or most encountered) or the operating range.

In some embodiments the matched refractive indices at 25 degrees Celsius and 589.3 nm of light (i.e. $n_{D25}$) are preferably less than 1.445, and more preferably less than 1.434, and most preferably less than 1.426.

Preferably, the refractive index of the solid polymer is reduced to index match the low refractive index of typical suspending fluids such as aliphatic hydrocarbons, or the preferred suspending fluid herein, organosilicone.

In embodiments said optically-transparent, elastomeric, non-planar, solid polymer element has 3% or less haze in its bulk (i.e. internally in less than 50 micron thickness), and preferably less than 2%, and most preferably less than 1%.

In embodiments said optically-transparent, elastomeric, non-planar, solid polymer element has birefringence of less than 0.005.

In embodiments said optically-transparent, elastomeric, non-planar, solid polymer element is either amorphous (preferred) or has nanometre-scale, crystalline segments in otherwise amorphous polymer and is semi-crystalline.

In embodiments that have semi-crystalline polymer at least 50%, and preferably at least 85%, of crystalline segments have a maximum dimension of 200 nm, and preferably a maximum of 125 nm, and more preferably a maximum of 85 nm, and most preferably a maximum of 65 nm.

In embodiments that have an amorphous, elastomeric, non-planar, solid polymer element said viscoelastic property is dependent on the density of covalent (i.e. chemical) crosslinks that crosslink molecules ranging from oligomer to polymer macromolecules (comprising multiple monomer units), and said elastomer is a homogeneous thermoset rubber.

In embodiments that have a semi-crystalline, elastomeric, non-planar, solid polymer element said viscoelastic property is dependent on the density of physical crosslinks provided by crystalline segments, and said elastomer is a thermoplastic rubber.

In embodiments said elastomeric, non-planar, solid polymer element has flexible linkages in its backbone and includes one or more of the following linkages: ether (i.e. R—O—R'), siloxane (i.e. Si—O—Si), fluoroether (i.e. $CF_2$—O—$CF_2$), thioether (i.e. R—S—R'), methylene (i.e. $CH_2$), difluoromethylene (i.e. $CF_2$), or phosphazene (i.e. N═P); and, siloxane is preferred.

In embodiments 75% or more of said suspending fluid includes one or more of the following, or copolymers of two of the following: an aliphatic hydrocarbon compound, an organosilicone compound, an organofluorine compound (e.g., fluorocarbon, perfluorocarbon, or perfluoroalkoxy), or a fluorosilicone compound (e.g., fluoroalkylsiloxane); and, the preferred suspending fluid is a low molecular weight polymer and has repeat units comprising one or more of: dimethylsiloxane, diethylsiloxane, methylalkylsiloxane, dialkylsiloxane, or methylphenylsiloxane.

In embodiments said suspending fluid comprises 75% or more of oligomers or short chain polymers (or copolymers), and the resultant kinematic viscosity at 75 degrees Celsius is more than 2 cSt, and preferably more than 3 cSt, and most preferably more than 3.5 cSt.

In some embodiments the resultant kinematic viscosity at −25 degrees Celsius is less than 350 cSt, and preferably less than 200 cSt, and most preferably less than 125 cSt.

In some embodiments a minority of high molecular weight polymer is dissolved in said suspending fluid as a minority additive and is polydimethylsiloxane, polydiethylsiloxane, or polymethylalkylsiloxane.

In embodiments said suspending fluid has a boiling point at atmospheric pressure of at least twice said device's maximum operating temperature in degrees Celsius, and preferably at least 200 degrees Celsius, and a pour point at least 1.5 times lower than the minimum operating temperature, and preferably at least −30 degrees Celsius (i.e. 243K), and more preferably at least −45 degrees Celsius (i.e. 228K), and most preferably at least −55 degrees Celsius (i.e. 218K); and said suspending fluid is free of crystals (from crystallization of the fluid) having a dimension greater than 200 nm at said device's minimum operating temperature.

In embodiments said elastomeric, non-planar, solid polymer element has a maximum continuous use temperature (i.e. service temperature) significantly greater than the maximum operating temperature of said device, and preferably greater than 125 degrees Celsius, more preferably greater than 150 degrees Celsius, and most preferably greater than 175 degrees Celsius.

In embodiments said elastomeric, non-planar, solid polymer includes the following polymers, or copolymers or terpolymers (including with other polymers) that use one or more of the following: a polysiloxane, a fluoroalkane polymer, a perfluoroether polymer, a fluorosilicone polymer, a fluorinated (meth)acrylate polymer, a fluorosilicone (meth) acrylate polymer, a fluorinated polyolefin polymer, a fluorinated aliphatic polycarbonate, or a fluorinated polyurethane, and copolymers include a fluorosilicone-co-siloxane copolymer, a fluorosilicone-co-fluoroalkane copolymer, or a fluoroether-co-siloxane copolymer.

In embodiments that have a fluorinated elastomer, its polymer (or copolymer) has at least one pendant group containing an $CF_3$ (moiety); and the fluorinated polymer includes a repeat unit of the type fluoroalkylsiloxane including (but not limited to) methyltrifluoropropylsiloxane (MTFPS), methylpentafluorobutylsiloxane, methylheptafluoropentylsiloxane, or methylnonafluorohexylsiloxane. Alternatively, the fluorinated polymer has a repeat unit of the type fluoroalkoxyalkylsiloxane.

In some embodiments said suspending fluid is an organosilicone and/or an aliphatic hydrocarbon and said non-planar, solid polymer is a fluorinated, elastomeric, polymer; and, preferably said suspending fluid is silicone oil comprising 75% or more (by mole %) of one or more of the following polymer repeat units: dimethylsiloxane, methylalkylsiloxane, or methylphenylsiloxane, and said solid polymer is a fluorosilicone or fluorosilicone containing copolymer and comprises more than 10% (by mole %) methyltrifluoropropylsiloxane, and preferably more than 20%, and most preferably more than 25%.

Advantageously in these embodiments the fluorinated siloxane elastomers have a greater dielectric constant than the organosilicone fluids or the aliphatic hydrocarbon fluids.

In alternative embodiments said suspending fluid is a fluorosilicone or fluorosilicone containing copolymer having at least one pendant group containing a phenyl group, and said non-planar, solid polymer is a polysiloxane elastomer; and, preferably said suspending fluid comprises more than 10% (by mole %) methyltrifluoropropylsiloxane, and preferably more than 20%, and most preferably more than 25%, and said solid polymer is polydimethylsiloxane.

In some embodiments said elastomeric, non-planar, solid polymer can have multiple cure functional groups including thermal-curing and photo-curing groups.

In embodiments the crosslink cure chemistry in said elastomeric, non-planar, solid polymer element that has a siloxane backbone includes one of: platinum-catalysed hydrosilylation addition system, peroxide free-radical catalysed system, tin or zinc catalysed condensation system, thiol-ene free-radical addition system, or ultra-violet cured methacrylate and acrylate functional polymers (i.e. acryloxypropyl or methacryloxypropyl functional siloxanes); and, the platinum-catalysed hydrosilylation addition cure is preferred.

In some embodiments said siloxane-backbone elastomer has a prepolymer in the form of a two-part, liquid kit comprising a base (i.e. catalyst and vinyl) component in one part and a curing (i.e. crosslinker) component in the other part, and said crosslink density is varied by selecting the ratio of the two parts in the resulting prepolymer and curing to said elastomeric, solid polymer.

In some embodiments said crosslink density is further varied by selecting the chain length of the vinyl-terminated fluorosilicone (or fluorosilicone copolymer) in said base component, and/or incorporating vinyl substituent groups into said chain, and by selecting the percent hydride in said curing component.

In some embodiments said elastomer prepolymer and said suspending fluid are lot-matched; and, in alternative embodiments said cured, elastomeric, non-planar, solid polymer and said suspending fluid are lot-matched.

In some embodiments such as defined above, the refractive index of non-planar, solid polymer elements within an electrophoretic cell are refractive index matched to the suspending fluid over half or more of the operating temperature range by matching the thermo-optic coefficient of the solid polymer to the optically-transparent fluid's coefficient. This is achieved using optically-transparent, elastomeric, solid polymer. In addition, in some embodiments the chromatic dispersion of the solid polymer and the suspending fluid are matched.

Some embodiments avoid increasing the solubility and toxicity of the suspending fluid by reducing the refractive index of the elastomeric, non-planar, solid polymer to index match low-refractive-index, suspending fluids. A fluorinated solid polymer is used in some embodiments to do this. Furthermore, fluorinated solid polymer gives embodiments excellent chemical resistance (not soluble or swellable) to low-refractive-index fluids such as silicone oil and aliphatic hydrocarbon oil at prolonged elevated temperature and a lifetime measured in years. Preferred material choices, such as polysiloxane suspending fluid and fluorosilicone solid polymer, deliver photostability, service temperature, and low temperature operation.

In embodiments said charged particles move between said first and second light states to provide at least one light state intermediate said first and second states, and said intermediate light state has a light transmittance intermediate that of said first and second light states.

In some embodiments said electrophoretic device has at least one light state that is substantially transparent to visible light to provide visual access there through.

In some embodiments said electrophoretic device can be a layer of a glass laminate and be a window, or a device can incorporate a specularly reflective surface and be a mirror, or a light attenuator can be used as a light shutter, a light modulator, a variable light transmittance sheet, a variable light absorptance sheet, a variable light reflectance sheet, a sunlight glare avoidance window or visor, a see-through display, a monochrome, reflective display, or a colour, reflective display that uses a colour filter with said monochrome display.

In some embodiments said electrophoretic cell comprises said electrophoretic ink distributed in discrete or semi-discrete volumes, and said volumes of said electrophoretic ink form a monolayer that is adjacent one of said electrodes on one side and adjacent said non-planar polymer structure comprising a monolayer of close packed protrusions (i.e. polymer balls or hemispheres) on the opposite side, and the protrusions project into the volumes and are in contact with the suspending fluid, and said charged particles move over (i.e. are deflected by) a protrusion's surface projecting into said volume in response to an applied electrical field to concentrate in the space between protrusions (i.e. the interstices) in said second light state.

In some embodiments said electrodes are transparent and coated onto a pair of substrates, and preferably said substrates are film substrates and said electrophoretic device is an electrophoretic film device.

In some embodiments said electrophoretic film device is laminated between a pair of adhesive layers (e.g. EVA interlayers) and a pair of glass panes, and each adhesive layer covers substantially the full surface of each pane and bonds an opposing face of said electrophoretic device to a face of a pane, and the electrophoretic laminate is a monolith.

In alternative embodiments an electrophoretic laminate comprises said electrophoretic film device applied to a rigid pane using an adhesive layer.

In yet other alternative embodiments an electrophoretic laminate comprises said electrophoretic film device applied to a glass laminate (e.g., glass pane+PVB interlayer+glass pane) using an adhesive layer, and preferably said adhesive is a pressure sensitive adhesive.

In some embodiments said glass panes are treated to make them more resilient to thermal shock using one of the following processes: heat strengthening, chemical toughening, or thermal toughening.

In some embodiments a risk of spontaneous breakage of said glass panes due to thermal stress can be greatly reduced or eliminated by subjecting panes that are one of heat-strengthened, chemically-toughened, or thermally-toughened, to a heat soak test or treatment that through a process of elimination identifies good panes for use as panes in said electrophoretic laminate.

Embodiments of the invention can be incorporated as part of an insulated glass unit (IGU) which has a cavity between an inner pane and an outer pane, and one of the inner or outer panes is said electrophoretic laminate.

In use, some embodiments are mounted in a frame that defines an opening and function as an electro-active window.

In some embodiments heat build-up caused by charged particles absorbing sunlight energy is about halved by using wavelength-selective charged particles that substantially transmit or reflect the sunlight infrared spectrum (when compared to charged particles that absorb all bands).

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1A:
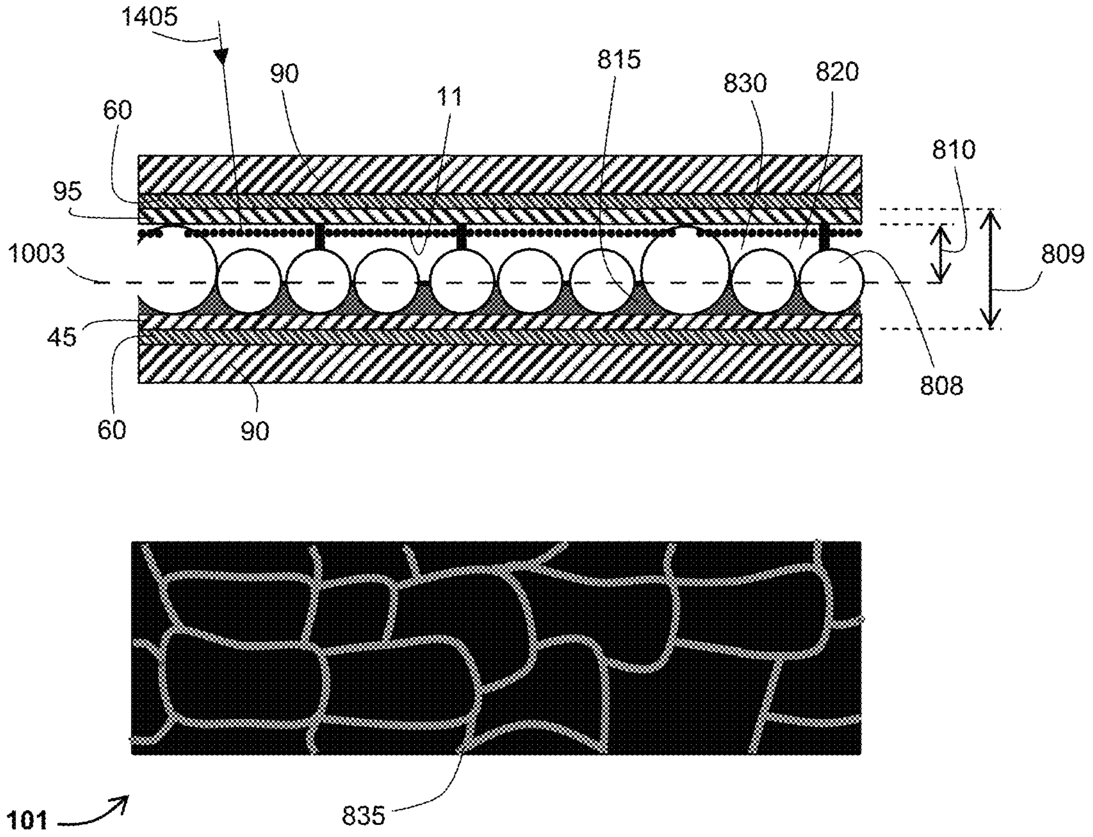
FIG. 1A shows an embodiment 101 of the present invention in a first light state. Electrophoretic ink 830 has negatively-charged, black particles 11, and the ink is divided into cavities 80 using a PIPS process step.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present invention provides an electrophoretic device whose electrophoretic cell has one or more transparent light states. The device has a wide operating temperature range suitable for many of the climates found in highly populated parts of the world. Advantageously, the device is suitable for applications that are exposed to outdoor temperatures and to sunlight.

In a first aspect the refractive index of non-planar, solid polymer elements within the electrophoretic cell are refractive index matched to the suspending fluid over half or more of the operating temperature range by matching the thermo-optic coefficient (i.e. the temperature coefficient of refractive index per Kelvin also known as the differential of refractive index with respect to temperature dn/dT) of the solid polymer to the optically-transparent fluid's coefficient. This is achieved using optically-transparent, elastomeric, solid polymer.

In another aspect the chromatic dispersion of non-planar, solid polymer elements and the suspending fluid are minimized to be close to, or less than, the resolution of a standardized viewer's eye, and preferably the chromatic dispersion of both is matched if within the range perceivable by the eye. This is achieved by minimizing the aromatic (i.e. aryl) content of both.

In another aspect the matched refractive indices of the non-planar solid polymer elements and the suspending fluid are less than 1.46. This has the effect of reducing the refractive index of the non-planar, solid polymer to index match a low-refractive-index, suspending fluid thereby avoiding an increase in the solubility and toxicity of the suspending fluid associated with high index fluids. Fluorinated solid polymer (synonymous with partially fluorinated herein) is used in some embodiments as a way to reduce the refractive index of the non-planar solid polymer.

In another aspect the pairing of suspending fluid and non-planar, solid polymer elements comprises an organo-silicone and/or an aliphatic hydrocarbon suspending fluid and a fluorinated, elastomeric, non-planar polymer. The fluorinated solid polymer gives embodiments excellent chemical resistance (not soluble or swellable) to low-refractive-index fluids such as silicone oil and isoparaffin oil (an aliphatic hydrocarbon or alkane) at prolonged elevated temperature and a lifetime measured in years.

Through the methods and materials described an embodiment's operating temperature range is significantly greater than prior art electrophoretic devices and spans at least 30 degrees Celsius, and preferably 50 degrees or more, and more preferably 70 degrees or more. In some embodiments the operating temperature range is from 0 degrees Celsius to 70 degrees Celsius (the latter to allow for elevated temperature use in the event of significant heat build-up due to solar energy absorption in hot climates), and more preferably, from −10 degrees Celsius to 70 degrees Celsius, even more preferably from −20 degrees Celsius to 85 degrees Celsius, and most preferably from −40 degrees Celsius to 100 degrees Celsius. The materials described for use in embodiments are high performance materials as this classification relates to outdoor use. Advantageously these materials also provide embodiments with very good photo-stability.

In embodiments the electrophoretic cell has one or more non-planar, solid polymer elements in contact with a suspending fluid. A non-planar, solid polymer element refers to any solid polymer surface in contact with the suspending fluid that is not continuously parallel to the faces of the electrophoretic cell. In this regard a continuous insulating layer (i.e. a dielectric solid polymer layer) formed on the surface of one substrate does not constitute a non-planar polymer element, but a patterned insulating layer does constitute a non-planar element. In an alternative definition any solid polymer element within an electrophoretic cell that causes light scattering unless refractive index matched to the suspending fluid constitutes non-planar elements. It will be appreciated that a continuous polymer layer having a surface parallel to the faces of an electrophoretic device need not be refractive index matched to avoid light scattering, and examples of such layers include PET substrates, uniform-thickness adhesive layers, or uniform-thickness insulating layers. There is no requirement to refractive index match the PET substrates to the ITO electrodes or to the electrophoretic cell to avoid light scattering because the substrates are continuous and parallel to the device faces.

Figure 1B:
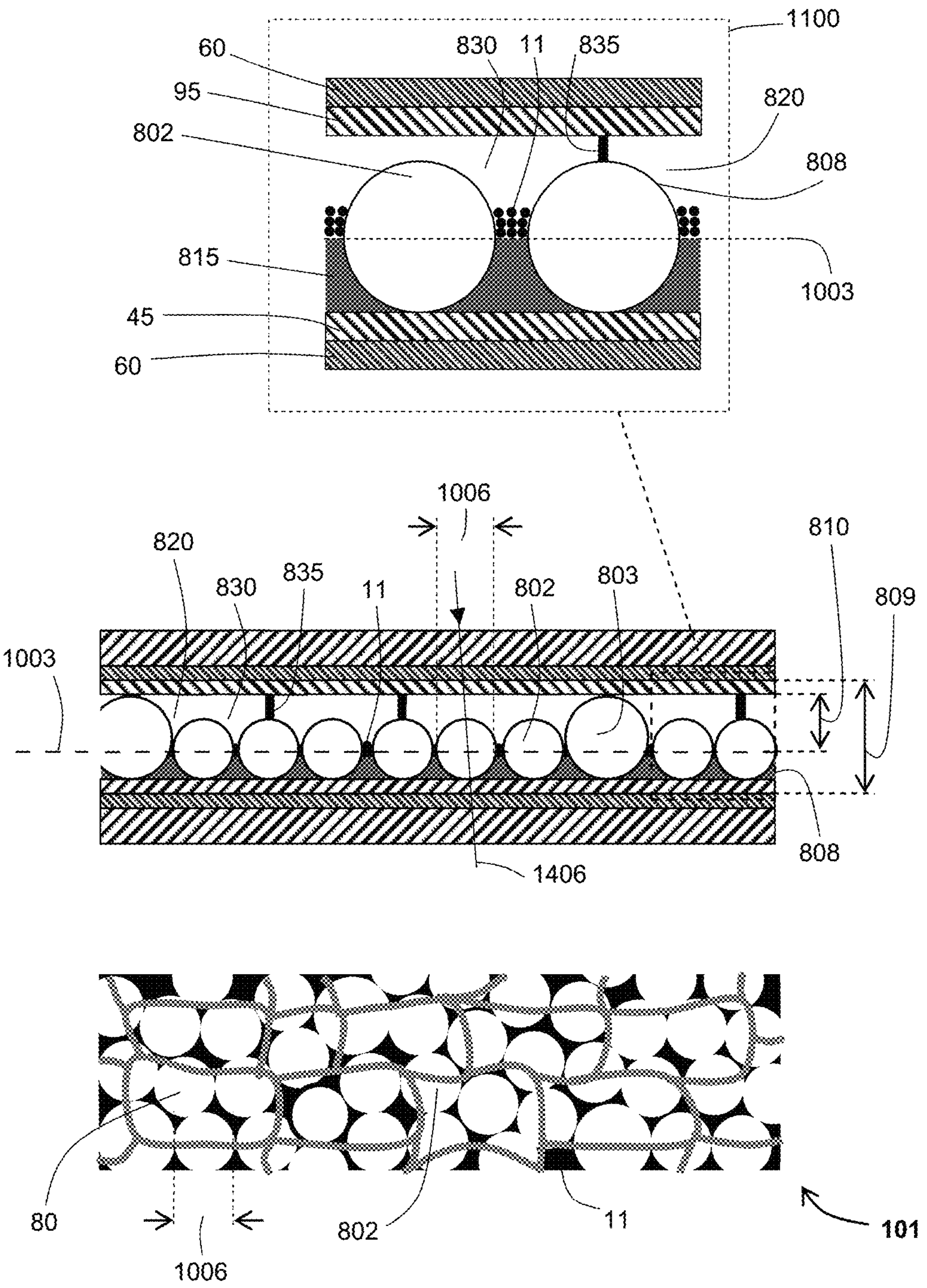
FIG. 1B shows the embodiment 101 of FIG. 1A in a second light state.

Examples of preferred electrophoretic devices are described in the related Irish Patent Application No. S2013/0104 titled "An Electrophoretic Device Having a Transparent Light State" filed on 22 Mar. 2013. FIGS. 1A and 1B show the embodiment 101 based on a device of this type and are described later. The manufacturing aspect referred to in that document includes a description of a device that uses spherical-cap-shaped cavities in a non-planar structure to concentrate or collect charged particles in a transparent light state, and it will be appreciated that embodiments herein can equally be of this type. US2011/0149376 describes hybrid electrophoretic devices and when the methods and materials described herein are applied to such devices they are capable of providing optically-transparent light states. The patterned dielectric layer in that document corresponds to a non-planar, solid polymer element for the purposes of the current document. In such embodiments charged particles collect in photolithographically formed recesses in a non-planar solid polymer in a transparent light state and disperse within the suspending fluid in a dark light state. The interface between the recesses and the suspending fluid causes significant light scattering (particularly for acute viewing angles) unless refractive index matched to the suspending fluid. These and other embodiments will be apparent from the methods and materials described herein.

In the prior art it is known to refractive index match a suspending fluid to an encapsulating capsule/shell and polymer binder/matrix within an electrophoretic cell (i.e. non-planar polymer elements), see for example E Ink's U.S. Pat. No. 6,515,649. But the prior art of electrophoretic devices does not describe suitable optically-transparent polymers, and the polyurethane binders described in E Ink's U.S. Pat. No. 6,515,649 are semi-crystalline, thermoset, aliphatic polyurethanes that are somewhat translucent due to the non-negligible haze caused by light scattering/refraction at their crystalline boundaries. These water-borne, polyurethane latexes were developed for paint and wood coatings and are not suited for low-haze, optically-transparent devices. There is no requirement for optical quality (i.e. <3% haze) solid polymer in an electrophoretic cell used in reflective display devices as these devices diffusely reflect visible light; however, somewhat translucent, semi-crystalline polymer (includes aliphatic, thermoset polyurethanes) is not suitable for optically-transparent devices that transmit specular light to provide unrestricted visual access such as when incorporated into a window.

The prior art describes making a refractive index match at a standard or reference temperature and for a specific wavelength of visible light (e.g., 546 nm ($n_e$) or 589 nm ($n_D$)). Other than matching at a reference temperature and wavelength the prior art is silent with respect to refractive index, and significant changes in the refractive index resulting from large temperature changes (i.e. 15 degrees Celsius or more), and changes with the wavelength of light across the visible spectrum, are ignored.

In trials (i.e. comparative examples that illustrate some of the problems that embodiments solve) the applicant made a non-planar, solid polymer structure similar to 808 shown in FIGS. 1A and 1B (i.e. close-packed solid polymer hemispheres in contact with a suspending fluid). The solid polymer used was PMMA (refractive index=1.490) and the suspending fluid was an 18:82 blend by mass of Isopar M (available from www.exxonmobilchemical.com) and o-xylene (available from www.sigmaaldrich.com) that index matched the solid polymer at $n_{D20}$ to within 0.002. The applicant discovered that an electrophoretic device that has minimal haze at the reference temperature (e.g., 3% or less) due to refractive index matching between the optically-transparent, non-planar, solid polymer hemispheres (PMMA) and the optically-transparent, suspending fluid (Isopar M+o-xylene), develops perceivable haze (about 6% to 8%) from 10 degrees Celsius above or below the reference temperature, and becomes cloudy or translucent with objectionable haze at 50 degrees Celsius or more above or below the reference temperature. On returning to the reference temperature without delay the minimal haze appearance is restored. The applicant discovered that this temperature related haze problem is due to a mismatch in the temperature coefficients of refractive index (i.e. the thermo-optic coefficients) of the non-planar, solid polymer elements and the suspending fluid. The mismatch relates to the difference in the rate of volume change with temperature of the solid polymer and the liquid suspending fluid.

Furthermore, and to a lesser extent, refractive index matching at a reference temperature and reference visible light wavelength does not take into account that refractive index varies with the wavelength of incident light—known as chromatic dispersion—and that a non-planar, solid polymer and a liquid suspending fluid can have a significant dispersion difference contributing to slight coloured haze at the reference temperature and exacerbated over a wide viewing angle and a wide operating temperature range. In comparative trials the PMMA solid polymer film with exposed hemispheres was indexed matched to Isopar M+o-xylene (an 18:82 blend by mass) and appears haze-free when viewed at 90 degrees to its surface, or when viewing uniformly illuminated objects through the film at acute angle. However, when viewing a bright object such as a naked fluorescent tube through the device a coloured-fringe-effect (or glow or halo) is apparent at the edge of (or surrounding) these bright objects. This coloured-fringe-effect (caused by chromatic dispersion mismatch) is also perceivable when there is a significant ambient light level imbalance on either side of the device such as when looking through a window (incorporating the device) from the outside at night at objects in a brightly lit room. A colour-fringe-effect (i.e. caused by chromatic dispersion mismatch) can also be apparent in a window (incorporating the device) illuminated at an acute angle to its surface at night time such as by a standing lamp to the side of the window or a lamp directly over a window.

It is thought that light at the index match wavelength (i.e. $n_{D20}$) experiences no refraction regardless of viewing angle or light levels, whereas light at other visible wavelengths experiences differences in the refractive indices with blue light experiencing the greatest mismatch and hence refraction. The mismatch relates to the difference in the chromatic dispersion of the solid polymer and the liquid suspending fluid. It is thought that in this example the PMMA solid polymer has no aromatic (i.e. aryl) content whereas the aromatic content of the suspending fluid is significant because of the o-xylene component creating a chromatic dispersion mismatch.

In known commercial electrophoretic devices (e.g., ebook readers) the suspending fluid does not refractive index match surrounding polymer elements. The suspending fluid has a much lower index (typically about 1.42 to 1.44) than the polymer elements (typically about 1.48 to 1.54) and such devices are not able to provide a transparent state. It is proposed in the prior art that a suspending fluid's refractive index can be raised to the level of the polymer elements within an electrophoretic cell by adding aromatic hydrocarbons or aryl substituent groups, or halogenated hydrocarbons. Examples of such suspending fluids are given in Seiko Epson's U.S. Pat. No. 8,174,755 (referred to as solvents), incorporated herein by reference in its entirety. In the Seiko Epson document a long period of time under high temperature and high humidity is referred to as 60 degrees Celsius and 90% R.H. for 24 hours, and prior art devices were said to develop degraded optical performance (i.e. display contrast) as a consequence of just 24 hours at this high temperature. In E Ink's US2008/0130092 (incorporated herein by reference), chloronaphthalene is admixed at about 55% to a typical aliphatic hydrocarbon suspending fluid to increase the fluid's refractive index from 1.42 to the 1.53 of the surrounding non-planar polymer in the electrophoretic cell (i.e. the encapsulating coacervation polymer capsule and polyurethane binder). But, the prior art is silent with respect to the implications for the polymer elements in contact with the resulting suspending fluid: raising the refractive index of a suspending fluid significantly increases the fluid's solubility and toxicity profile.

The ability of a solvent to dissolve, solubilize or swell a polymer can be estimated from its Hansen solubility parameters (see entry in www.wikipedia.org) as well as from trials. An aliphatic hydrocarbon suspending fluid such as Isopar M (representative of some suspending fluids used in electrophoretic display devices) has a low Hansen dispersion solubility parameter and no polar or hydrogen bonding parameters: dispersion=16.0 ($MPa^{1/2}$), polar=0.0 ($MPa^{1/2}$), and hydrogen bonding=0.0 ($MPa^{1/2}$) making it a non-solvent, for a polymer binder (i.e. polymer matrix) having significant polar and/or hydrogen bonding solubility parameters such as typical polyurethanes: dispersion=18.1 ($MPa^{1/2}$), polar=9.3 ($MPa^{1/2}$), and hydrogen bonding=4.5 ($MPa^{1/2}$). But adding chloronaphthalene (dispersion=19.9, polar=4.9, and hydrogen bonding=2.5) to raise the refractive index of the suspending fluid results in a solvent having closer solubility parameters to a polyurethane binder and causes the polyurethane binder to swell and degrade over time even at 25 degrees Celsius. The RED ratio (described later) for the first pairing (i.e. polyurethane solid polymer and Isopar M fluid) is 1.15 indicating no swelling or affinity, and for the second pairing (polyurethane+chloronaphthalene) it is 0.62 indicating significant swelling and affinity.

In comparative trials involving solid PMMA polymer and Isopar M+o-xylene suspending fluid (the latter in an 18:82 blend by mass), a short time at elevated temperature (a few hours) was sufficient for the suspending fluid to begin solubilizing the PMMA polymer, the addition of o-xylene to raise the refractive index of the suspending fluid was significant in this regard. But unlike the prior art, in embodiments it is preferred to reduce the refractive index of the solid polymer to match a low-refractive-index, suspending fluid thereby avoiding increasing the solubility and toxicity of the suspending fluid. Furthermore, in some embodiments a fluorinated solid polymer is used to achieve excellent chemical resistance (not soluble or swellable) to low-refractive-index fluids such as silicone oil and aliphatic hydrocarbon oil at prolonged elevated temperature and a lifetime measured in years. Suitable pairings of refractive index matching solid polymer and suspending fluid that are not soluble and avoid swelling even at high temperature are described in following sections. These pairing are also selected to exhibit very good photo-stability and generally fall within the classification of high performance materials.

In the next sections the preceding advantages will be described in detail. In embodiments an electrophoretic device (e.g., 101 in FIGS. 1A and 1B) comprises an electrophoretic cell (809) sandwiched between two electrodes (60). The electrophoretic cell (809) contains an electrophoretic ink (830) and one or more optically-transparent, non-planar, solid polymer elements or structures (808) within the cell (809). The electrophoretic ink (830) includes charged particles (11) of at least one type suspended in an optically-transparent, suspending fluid (820), and the charged particles (11) move position (i.e. translate) in response to an electric field applied using the electrodes (60). The charged particles (11) are responsive to an electric field (not shown in FIGS. 1A and 1B) applied to the electrophoretic device (101) to move between: a first extreme light state in which particles (11) are maximally spread within the cell (809) to lie in the path of sunlight (see light ray 1405) through the cell and to strongly attenuate light transmitted through the cell as shown in FIG. 1A, and a second extreme light state in which the particles (11) are maximally concentrated within the cell (809) to remove them from the path of sunlight through the cell and to substantially transmit light (see light ray 1406) through the cell as shown in FIG. 1B. An optically transparent light state is provided in some embodiments (e.g., FIG. 1B) by keeping the refractive indices of the non-planar, solid polymer elements (808) and the suspending fluid (820) closely matched to have a difference of less than 0.0075. The refractive index of the suspending fluid is synonymous with the refractive index of the electrophoretic ink herein.

A negative electrical field moves negatively charged particles (11) from a prior first light state (see FIG. 1A) in the direction of the electrical field, and this direction is orthogonal to the plane of the electrodes (60). But on reaching protrusions on the non-planar solid polymer (808) their natural path (from a top electrode 60 adjacent electrophoretic ink 830 to a bottom electrode 60 adjacent non-planar, polymer structure 808) becomes blocked forcing the particles (11) to deflect over the surface of protrusions in the solid polymer (808). Together, the deflection caused by the solid surface of protrusions and the electrical field drive charged particles (11) to concentrate in the space/volume between protrusions (i.e. the interstices) and thereby remove particles (11) substantially from the path of light through the electrophoretic cell (809) in areas corresponding to the protrusions and represented as apertures (1006) in FIGS. 1A and 1B.

In intermediate light states the electrical field is removed (i.e. zero volts applied) before charged particles (11) complete the transition from a first light state to a second light state. This results in apertures (1006) having a smaller diameter than in the second light state in proportion to the duration of the electrical field (i.e. the signal time). In FIGS. 1A and 1B the interface surface between the optically-transparent, non-planar, solid polymer 808 and ink 830 is formed by the hemispherical surfaces of polymer microspheres 802, polymer cell gap spacers 803, polymer cell walls 835, and solid polymer 815. The latter (815) fills the interstices up to the equator plane 1003 as shown in exploded view 1100 of FIG. 1B. Cavity walls 835 divide the ink 830 into discrete volumes 80. These and other features of FIGS. 1A and 1B are described later.

In a first aspect to preserve the refractive index match over half or more (and preferably all) of the operating temperature range of some embodiments the thermo-optic coefficients (i.e. the temperature coefficient of refractive index per Kelvin or dn/dT) of the non-planar, solid polymer elements (808) and the suspending fluid (820) are matched to have an arithmetic-mean difference of less than 0.0002/K in magnitude. The thermo-optic coefficients shown in this document were measured at 589.3 nm (i.e. $n_D$) unless otherwise noted, but the values are similar (not significantly different) to those for other visible light wavelengths as described later in relation to table 5.

In embodiments the magnitude of the thermo-optic coefficient (a negative value) of the non-planar, solid polymer elements is increased to match that of the suspending fluid (also a negative value). This is achieved by using an optically-transparent, elastomeric (i.e. elastomer-type) polymer for the non-planar, solid polymer elements (808). The elastomer has a glass transition temperature less than 20 degrees Celsius (i.e. 293K) and has crosslinks. This requirement contrasts with the prior art of electrophoretic devices where the use of an optically-transparent, elastomeric polymer for the non-planar elements within an electrophoretic cell is unknown.

In some embodiments the thermo-optic coefficients of the one-or-more elastomeric, non-planar, solid polymer elements and the suspending fluid are matched to have an arithmetic-mean difference of less than 0.000125/K in magnitude, and more preferably less than 0.0001/K, and most preferably less than 0.000075/K. The matched thermo-optic coefficients are both negative and have a magnitude greater than $2.25\times10^{-4}$/K, and preferably greater than $3.0\times10^{-4}$/K, and most preferably greater than $3.25\times10^{-4}$/K.

In some embodiments the transparent, elastomeric, non-planar, solid polymer (808) has a glass transition temperature (i.e. $T_g$) lower than the lowest operating temperature of the electrophoretic device, and preferably less than zero degrees Celsius (i.e. 273K), more preferably less than −10 degrees Celsius (i.e. 263K), even more preferably less than −20 degrees Celsius (i.e. 253K), and most preferably less than −40 degrees Celsius (i.e. 233K). By using solid polymer above its $T_g$ in embodiments, and preferably 10 to 20 degrees Celsius above $T_g$, the applicant found that the thermo-optic coefficient typically falls within the range $-3.0\times10^{-4}$/K to $-5.5\times10^{-4}$/K and can be matched to a suspending fluid.

Optical polymers for optic applications are typically used (i.e. used in the prior art) below their $T_g$ and have thermo-optic coefficients from about $-0.8\times10^{-4}$/K to $-1.6\times10^{-4}$/K as shown in table 1. The optically transparent polymers listed in table 1 have $T_g$ greater than 20 degrees Celsius and are not suitable for embodiments as their thermo-optic coefficients for temperatures less than $T_g$ cannot be matched to a suspending fluid. For example, in the previous comparative trial involving PMMA, non-planar, solid polymer and Isopar M+o-xylene suspending fluid both where a refractive index match (i.e. $n_{D20}$=1.490). The dn/dT for PMMA is $-1.1\times10^{-4}$/K (see table 1), for Isopar M it is $-4.1\times10^{-4}$/K, and for o-xylene it is $-5.0\times10^{-4}$/K. The resulting dn/dT for the suspending fluid was about $-4.8\times10^{-4}$/K causing a thermo-optic coefficient mismatch magnitude of $3.7\times10^{-4}$/K. This level of dn/dT mismatch causes a refractive index mismatch of 0.0037 over 10° C. causing a perceivable increase in haze, 0.0056 over 15° C. (i.e. 0.00037×15) causing a significant increase in haze, 0.011 over 30° C. causing objectionable haze, and 0.0185 over 50° C. causing a cloudy or translucent appearance.

In table 1 PMMA is polymethylmethacrylate ($T_g$=110° C.), PC (BPA) is polycarbonate bisphenol A ($T_g$=147° C.), PC (CR-39) is polycarbonate (poly allyl diglycol carbonate ($T_g$=85° C.)), PA is transparent polyamide ($T_g$=140° C.), COP is cyclo olefin polymer ($T_g$=138° C.), PMP is polymethylpentene ($T_g$=22° C.), SAN is styrene acrylonitrile ($T_g$=105° C.), CYTOP (see www.AGC.com) is an amorphous fluoropolymer ($T_g$=108° C.), and Teflon AF (see www.Dupont.com) is also an amorphous fluoropolymer ($T_g$=160° C.). $n_{D20}$ is the refractive index at 20° C. and 589.3 nm, E is the Young's Modulus, and $T_s$ is the maximum service temperature.

The data shown in the tables that follow (i.e. tables 1 to 6) was compiled from multiple sources where available or measured by the applicant and highlight features of embodiments. Refractive index measurements were made using an Abbe refractometer, suitable instruments are available from www.atago.net such as models NAR-2T (measurement temperature range 5° C. to 120° C.), NAR-3T (high accuracy liquids and solid measurement), and DR-M2 (multi-wavelength and Abbe number measurement). The thermo-optic coefficient for a temperature interval/range can be calculated by measuring the refractive index at the two temperatures that define the interval (e.g., an interval of 5K or 10K difference) and dividing the difference in refractive index by the difference in temperature. This calculation relies on the near linear relationship between temperature and the thermo-optic coefficient once about 20K either side of the material's glass transition temperature.

The applicant found that the thermo-optic coefficient (i.e. the rate of change of refractive index with temperature per Kelvin) of optically-transparent polymers below their glass transition temperature is typically about $-0.8\times10^{-4}$/K to $-1.6\times10^{-4}$/K as shown in table 1, and these solid polymers cannot be matched to a suspending fluid for this part of the operating temperature range (i.e. temperatures$\leq T_g$). This relationship between thermo-optic coefficient and $T_g$ is highlighted by PMP in table 1: below $T_g$ the thermo-optic coefficient is $-1.9\times10^{-4}$/K whereas from about 10 to 20° C. above $T_g$ it is $-4.1\times10^{-4}$/K.

By contrast to table 1, the thermo-optic coefficient of optically-transparent polymers suitable for embodiments have a thermo-optic coefficient from $-2.25\times10^{-4}$/K to $-5.5\times10^{-4}$/K, and some examples are shown in table 2. These polymers can be matched to suitable suspending fluids such as described later in relation to table 4. For example, a copolymer of polymethyltrifluoropropyl siloxane and polydiphenylsiloxane (i.e. P(MTFPS-co-DPhS) can be used to refractive index match the silicone oil suspending fluid PDMS (n=7) shown in table 4 at $n_{D25}$ (i.e. 1.396). The dn/dT for P(MTFPS-co-DPhS) is selected to be $-4.5\times10^{-4}$/K using its degree or density of crosslinking (see table 2). The dn/dT for PDMS (n=7) is $-4.88\times10^{-4}$/K causing a thermo-optic coefficient mismatch magnitude of $0.38\times10^{-4}$/K (i.e. 4.88-$4.5\times10^{-4}$/K). This level of dn/dT mismatch causes a refractive index mismatch of 0.00057 over 15° C. (i.e. 0.000038×15) and is not perceivable, 0.0011 over 30° C. and similarly is not perceivable, and 0.0019 over 50° C. and similarly is not perceivable or is at the limit of an observer's resolvable haze difference.

The optically-transparent polymer examples shown in table 2 for use in embodiments are elastomeric and amorphous, and have a $T_g$ less than the operating temperature range of embodiments. In table 2 PDMS is crosslinked polydimethylsiloxane and is an optically-transparent elastomer. Its $T_g$ lies in the range −100° C. to −125° C., well below the operating temperature range of embodiments. As a consequence PDMS elastomer has a linear thermo-optic coefficient over the operating temperature range of embodiments and by varying the elastomer's density (or degree or level) of crosslinking the coefficient can be selected from within the range $-3.0\times10^{-4}$/K to $-5.1\times10^{-4}$/K. Sylgard-184 is a commercial polysiloxane elastomer prepolymer available as a two-part kit from www.dowcorning.com. When mixed in the recommended 10:1 ratio the resulting crosslinked, solid polymer is optically-transparent, has a thermo-optic coefficient of $-4.5\times10^{-4}$/K, and a $T_g$ of −115° C. Sylgard-184 uses a platinum-catalysed, addition-cure, crosslink chemistry (described later).

PMTFPS is crosslinked polymethyltrifluoropropyl siloxane—a fluorinated siloxane (synonymous with a polysiloxane that has fluorine content). In embodiments PMTFPS has a $T_g$ in the range −65° C. to −75° C. and a thermo-optic coefficient in the range $-3.25\times10^{-4}$/K to $-5.0\times10^{-4}$/K, selectable using the degree of crosslinking. Table 2 shows a number of crosslinked copolymers that incorporate methyltrifluoropropylsiloxane (MTFPS) repeat units and are dominated by the characteristics of this repeat unit except that the copolymer's refractive index can be increased depending on the mole percentage of the other repeat unit. The copolymers are optically-transparent elastomers with $T_g$ of −65° C. or less and thermo-optic coefficients in the range $-3.25\times10^{-4}$/K to $-5.0\times10^{-4}$/K, selectable using the degree of crosslinking. P(MTFPS-co-DMS) is a copolymer of methyltrifluoropropylsiloxane and dimethylsiloxane repeat units; P(MTFPS-co-MPhS) is a copolymer of methyltrifluoropropylsiloxane and methylphenylsiloxane; and, P(MTFPS-co-DPhS) is a copolymer of methyltrifluoropropylsiloxane and diphenylsiloxane.

Thermo-optic coefficients of some fluids that can be used as part or all of a suspending fluid are shown in tables 3 and 4. The table 3 fluid examples have limited suitability for embodiments and if used would be a minority component of a suspending fluid. With regard to matching the thermo-optic coefficient of a fluid to an elastomeric solid polymer, table 3 shows some fluid examples that have a coefficient in the range $-3.5\times10^{-4}$/K to $-5.5\times10^{-4}$/K making it possible to achieve a match. For example, n-decane (a linear alkane) has a thermo-optic coefficient of $-4.5\times10^{-4}$/K and a refractive index ($n_D$@25° C.) of 1.4097 making it possible to both refractive index match and thermo-optic coefficient match to an elastomeric PDMS such as Sylgard-184 ($n_{D25}$=1.4118 and dn/dT=−4.5×$10^{-4}$/K). But as will be described later, an embodiment's requirement that the suspending fluid not significantly swell the elastomeric, solid polymer over the operating temperature range cannot be met by a pairing of n-decane with an elastomeric PDMS solid polymer. Furthermore, n-decane has a limited service temperature range (column $T_{service}$ in table 3) as its minimum temperature is about −10° C. due to the onset of wax crystallization in the fluid.

In another example from table 3 optical fluid 50350 (available from www.cargille.com) has a thermo-optic coefficient of about −4.1×$10^{-4}$/K and a refractive index ($n_D$@25° C.) of 1.4587 making it possible to both refractive index match and thermo-optic coefficient match to solid polymer PMP well above $T_g$, see table 1 ($n_{D20}$=1.460 and dn/dT=−4.1×$10^{-4}$/K>>$T_g$). But, below $T_g$ a satisfactory match cannot be made unduly limiting the operating temperature range. Furthermore, PMP will be significantly swelled by optical fluid 50350 (an alkane blend) at elevated temperature possibly leading to device failure.

Table 4 shows some examples of optically-transparent fluids suitable for embodiments. Some are suitable as the majority component of the suspending fluid while others are suitable as minority components blended to enhance one or more features or properties of the resultant electrophoretic ink. For example, it is known to blend a minority of very high molecular weight linear polymer in a low viscosity fluid to enhance charged particle stability. In the examples PDMS is a polymeric fluid of polydimethylsiloxane and has negligible crosslinking, the number of repeating units (an approximation) is shown in table 4. P(DMS-co-DPhS) is a polymeric fluid that is a copolymer of dimethylsiloxane and diphenylsiloxane, the latter is useful to raise the refractive index of a suspending fluid. Other dimethylsiloxane copolymers for the suspending fluid of embodiments include copolymers with methylphenylsiloxane or siloxanes with linear side groups such as diethylsiloxane or branched side groups. The polymeric siloxane fluids shown are available from a number of suppliers (for example, www.dowcorning.com or www.shin-etsu.com or www.wacker.com). Table 4 shows that the thermo-optic coefficient of polydimethylsiloxane fluid is dependent on the number of polymer repeating units and decreases from about −5.54×$10^{-4}$/K for n=1 to −4.78×$10^{-4}$/K for n=5 and −4.37×$10^{-4}$/K for n=50.

The Isopar series (available from www.exxonmobilchemical.com) of aliphatic hydrocarbons (also known as alkanes) are suitable for embodiments and are known in the prior art of electrophoretic display devices. But in embodiments the refractive index of solid polymer elements that constitute non-planar elements (or structures) within the electrophoretic cell are reduced to refractive index match the aliphatic hydrocarbon fluid unlike the prior art that raises the suspending fluid's index, and the pairing of suspending fluid and solid polymer are required to be mutually insoluble over the operating temperature range. These requirements are described in more detail later. The Shellsol series (available from www.shell.com/chemicals) of aliphatic hydrocarbons are a different blend of alkanes to the Isopar series.

The applicant found that for the same viscosity at 25° C. alkanes have slightly lower thermo-optic coefficients than their corresponding polysiloxane fluids. For example, Shellsol T has a kinematic viscosity of 1.9 cSt and a thermo-optic coefficient of −4.9×$10^{-4}$/K whereas PDMS (n=3) has a viscosity of 2.0 cSt and a coefficient of −5.47×$10^{-4}$/K. But, alkanes have appreciably higher refractive index than PDMS fluids—1.423 versus 1.391 for the respective fluids.

Any of the optically transparent fluids shown in table 4 can be used as the primary fluid (i.e. a pure fluid) or blended to refractive index match and thermo-optic coefficient match the elastomeric, non-planar, solid polymers of embodiments. For example, PDMS (n=1) fluid is a match to elastomeric PMTFPS (polymethyltrifluoropropyl siloxane), their respective indices are 1.382 and thermo-optic coefficients are −5.5×$10^{-4}$/K and about −4.5×$10^{-4}$/K (with average or less crosslinking). In another example, PDMS (n=3) fluid is a match to the elastomeric copolymer P(MTFPS-co-DMS) at a mole % of about 35% of MTFPS. Unlike the other copolymers in table 2, varying the mole % of MTFPS only slightly changes the resulting refractive index and is limited to a maximum of about 1.394. As shown in table 2, PDMS (n=26) fluid can be matched to elastomeric copolymer P(MTFPS-co-MPhS) at a mole % of about 86% of MTFPS, their respective indices are 1.400 and coefficients are −4.71×$10^{-4}$/K and about −4.5×$10^{-4}$/K. As the mole % of the copolymer's MTFPS reduces the resulting refractive index increases to a maximum of 1.459 at about 45%. Similarly, PDMS (n=79) fluid can be matched to P (MTFPS-co-DPhS) at a mole % of about 92.5% of MTFPS, and a refractive index maximum of 1.459 corresponds to a mole % of about 70%.

In these embodiment examples PMTFPS elastomer and its copolymers are fluorinated siloxane solid polymers insoluble in PDMS fluids over a wide operating temperature range. It will be appreciated that in other embodiments the optically-transparent, fluorinated elastomer copolymers can be used to refractive index match and thermo-optic coefficient match alkanes such as Isopar M and Shellsol T.

TABLE 1

Examples of Optical Polymers Not Suited to Embodiments

| Optical Polymer | dn/dT (×$10^{-4}$/K) | Tg (°C) | $n_D$ @20 °C | Abbe Number ($V_d$) | E (MPa) | Hardness (Shore D) | $T_s$ (°C) |
|---|---|---|---|---|---|---|---|
| PMMA | −1.1 | 110 | 1.490 | 53-57 | 2,500 | 92 | 80-85 |
| PC (BPA) | −1.4 | 147 | 1.586 | 30-34 | 2,400 | 90 | 116-120 |
| PC (CR-39) | −1.43 | 85 | 1.504 | 56-59 | 3,000 | 88 | 95-100 |
| PA | −1.6 | 140 | 1.516 | 52 | 1,400 | 81 | 100-105 |
| COP | −1.1 | 138 | 1.525 | 56 | 2,400 | 90 | 103-108 |
| PMP | −1.9 (<Tg)<br>−4.1 (>>Tg) | 22 | 1.46 | 52 | 1,900 | 90 | 144-149 |
| SAN | −1.1 | 105 | 1.567 | 34.8 | 3,600 | 85 | 75-85 |
| CYTOP | −0.8 | 108 | 1.34 | 90 | 1500 | 81 | |
| Teflon AF | −0.9 | 160 | 1.31 | 92 | 1800 | 75 | |

TABLE 2

Examples of Optically-Transparent Elastomers for Use in Embodiments

| Optical Polymer | dn/dT ($\times 10^{-4}$/K) | $T_g$ (°C) | $n_D$ @25 °C | Abbe No. ($V_d$) | E (MPa) | Hardness (Shore A) | $T_s$ (°C) |
|---|---|---|---|---|---|---|---|
| PDMS | −3.0 to −5.1 | −100 to −125 | 1.395 to 1.42 | 44-50 | 2-3 | 25-75 | 200 |
| Sylgard-184 (10:1) | −4.5 | −115 | 1.4118 | 44 | 2.66 | 48 | 200 |
| PMTFPS | −3.25 to −5.0 | −65 to −75 | 1.382 | 45-50 | 0.5 to 6.2 | 20-80 | 200 to 230 |
| P(MTFPS-co-DMS) | −3.25 to −5.0 | −65 to −75 | 1.382 to 1.394 | 45-50 | 0.5 to 6.2 | 20-80 | 200 to 230 |
| P(MTFPS-co-MPhS) | −3.25 to −5.0 | −65 to −75 | 1.382 to 1.459 | 42-50 | 0.5 to 6.2 | 20-80 | 200 to 230 |
| P(MTFPS-co-MPhS) (86:14) | −3.25 to −5.0 | −65 to −75 | 1.400 | 45-50 | 0.5 to 6.2 | 20-80 | 200 to 230 |
| P(MTFPS-co-DPhS) | −3.25 to −5.0 | −65 to −75 | 1.382 to 1.459 | 40-50 | 0.5 to 6.2 | 20-80 | 200 to 230 |
| P(MTFPS-co-DPhS) (92.5:7.5) | −3.25 to −5.0 | −65 to −75 | 1.403 | 45-50 | 0.5 to 6.2 | 20-80 | 200 to 230 |

TABLE 3

Examples of Optically-Transparent Fluids Having Limited Suitability for Embodiments Unless Used in Fluid Blends

| Optical Fluid | dn/dT $\times 10^{-4}$/K | $n_D$ @25 °C | Abbe Number ($V_d$) | $T_{pour}$ (°C) | $T_{bp}$ (°C) | $T_{service}$ (°C) | Viscosity (−25 °C) cSt | Viscosity (25 °C) cSt | Viscosity (75 °C) cSt |
|---|---|---|---|---|---|---|---|---|---|
| Tetrachloro-ethylene | −6.1 | 1.502 | 38.6 | −22 | 121 | −10 to ~80 | semisolid | 0.52 | ~0.35 |
| Toluene | −5.68 | 1.496 | 31 | −95 | 111 | -60 to ~75 | ~1.03 | 0.63 | 0.40 |
| Cyclohexane $C_6H_{12}$ | −5.56 | 1.427 | 56.5 | 6.5 | 81 | 10 to ~50 | semisolid | 1.16 | ~0.62 |
| m-xylene | −5.00 | 1.495 | 31.6 | −48 | 139 | −30 to ~90 | ~1.13 | 0.69 | ~0.44 |
| 50350 (alkanes) | −3.9 to −4.2 | 1.4587 | 56.7 | −7 | 262 | | semisolid | 19 | ~4 |
| P(DMS-co-DPhS) | −4.36 | 1.505 | 37.5 | −30 | >300 | −30 to 250 | ~24,800 | 450 | ~75 |
| PMTFPS | −4.1 | 1.382 | 42.4 | −47 | >300 | −40 to 200 | ~10,500 | 300 | ~50 |
| FC-43 ($C_{12}F_{27}N$) | −3.8 | 1.291 | ~100 | −50 | 174 | −30 to 120 | ~40 | 2.5 | ~0.75 |
| n-octane $C_8H_{18}$ | −4.7 | 1.395 | ~60 | −57 | 125 | −30 to 85 | | 0.7 | |
| Trimethyl-Pentane $C_8H_{18}$ | −4.2 | 1.389 | ~60 | −107 | 98 | −40 to 65 | | 0.7 | |
| n-decane $C_{10}H_{22}$ | −4.5 | 1.4097 | 59.6 | −30 | 174 | −10 to 115 | | 1.2 | |
| n-dodecane $C_{12}H_{26}$ | −4.3 | 1.4194 | 59.3 | −9 | 215 | 0 to 130 | semisolid | 1.84 | ~0.95 |

TABLE 4

Examples of Optically-Transparent Fluids Suitable for Embodiments

| Optical Fluid | dn/dT $\times 10^{-4}$/K | $n_D$@25 °C | Abbe Number ($V_d$) | $T_{pour}$ (°C) | $T_{bp}$ (°C) | $T_s$ (°C) | Viscosity (−25 °C) cSt | Viscosity (25 °C) cSt | Viscosity (75 °C) cSt |
|---|---|---|---|---|---|---|---|---|---|
| Siloxanes: | | | | | | | | | |
| PDMS (n = 1) | −5.54 | 1.382 | 41-42 | −85 | 153 | −50 to 100 | 3 | 1.0 | ~0.5 |
| PDMS (n = 3) | −5.47 | 1.391 | 41-42 | −80 | 229 | −50 to 150 | ~7 | 2.0 | ~0.9 |

TABLE 4-continued

Examples of Optically-Transparent Fluids Suitable for Embodiments

| Optical Fluid | dn/dT × $10^{-4}$/K | $n_D$@25 °C | Abbe Number ($V_d$) | $T_{pour}$ (°C) | $T_{bp}$ (°C) | $T_s$ (°C) | Viscosity (−25 °C) cSt | Viscosity (25 °C) cSt | Viscosity (75 °C) cSt |
|---|---|---|---|---|---|---|---|---|---|
| PDMS (n~7) | −4.88 | 1.396 | 41-42 | −65 | >300 | −40 to 150 | ~17 | 5.0 | ~2.1 |
| PDMS (n~15) | −4.78 | 1.399 | 41-42 | −60 | >300 | −40 to 150 | ~37 | 10 | ~4.2 |
| PDMS (n~26) | −4.71 | 1.400 | 41-42 | −60 | >300 | −40 to 150 | ~62 | 20 | ~9 |
| PDMS (n~38) | −4.49 | 1.401 | 41-42 | −50 | >300 | −40 to 150 | ~98 | 30 | ~13 |
| PDMS (n~50) | −4.37 | 1.402 | 41-42 | −50 | >300 | −40 to 150 | ~164 | 50 | ~23 |
| PDMS (n~79) | −4.34 | 1.403 | 41-42 | −50 | >300 | −40 to 150 | ~324 | 100 | ~43 |
| PDMS (n~126) | −4.34 | 1.403 | 41-42 | −50 | >300 | −40 to 150 | ~650 | 200 | ~87 |
| PDMS (n~232) | −4.34 | 1.403 | 41-42 | −50 | >300 | −40 to 150 | ~1,650 | 500 | ~217 |
| PDMS (n~377) | −4.29 | 1.403 | 41-42 | −50 | >300 | −40 to 150 | ~3,400 | 1,000 | ~430 |
| PDMS (n~846) | −4.29 | 1.403 | 41-42 | −50 | >300 | −40 to 150 | ~34,100 | 10,000 | ~4,300 |
| P(DMS-co-DPhS) | −4.66 | 1.425 | 40.5 | −65 | >300 | −60 to 200 | ~435 | 100 | ~40 |
| P(diethyl-siloxane) | −4.75 | 1.437 | 42-43 | −110 | >300 | −60 to 200 | ~37 | 10 | ~4.2 |
| Alkanes: | | | | | | | | | |
| Isopar M | −4.1 | 1.436 | ~58 | −57 | 202+ | −40 to 130 | ~21 | 3.25 | ~1.25 |
| ShellSol T | −4.9 | 1.423 | ~58 | −50 | 175+ | −40 to 110 | ~7.5 | 1.9 | ~0.95 |
| ShellSol TD | −4.8 | 1.418 | ~58 | −50 | 172+ | −40 to 110 | ~4.0 | 1.6 | ~0.81 |

In another aspect the chromatic dispersion of the non-planar, solid polymer element (808) and the suspending fluid (820) are matched to be about or less than the minimum resolution of the human eye, and expressing their chromatic dispersion in Abbe number $V_d$, both have a $V_d$ number greater than or equal to 39. The minimum resolution of the eye expressed in Abbe number is from about 43 to 47, and Abbe numbers higher than this correspond to less chromatic dispersion than the eye is capable of perceiving taking into account the photopic response (or luminosity function) of the human eye. Preferably in embodiments the Abbe number of both the non-planar, solid polymer element and the suspending fluid are greater than 42, and most preferably greater than 43.

If both materials' Abbe numbers (i.e. solid polymer and suspending fluid) exceed the chromatic dispersion resolving limit of the eye (also expressed in Abbe number), then any mismatch between their $V_d$ numbers cannot be perceived. In some embodiments the Abbe number of one or both materials can be less than the eye's resolving limit and in these embodiments the material with the lowest Abbe number is matched to have a difference of less than 8, and more preferably less than 5, and most preferably less than 3, with respect to the lessor of the other material's $V_d$ or the eye's minimum resolving $V_d$.

For example, in the previous comparative trial involving PMMA, non-planar, solid polymer and an 18:82 blend by mass of Isopar M+o-xylene suspending fluid both were a refractive index match at $n_{D20}$ (i.e. 1.490 @ 589.3 nm and 20° C.). The Abbe number for PMMA is 53-57 (see table 1) and so its chromatic dispersion cannot be resolved by the eye. The Abbe number for Isopar M is about 58, and for o-xylene it is about 31.6. The latter component dominates the suspending fluid (comprises 82% by mass) resulting in an Abbe number of about 35 causing perceivable coloured haze in certain circumstances due to the significant Abbe number mismatch between the fluid and the non-planar, solid polymer. This level of chromatic dispersion mismatch causes a $V_d$ number mismatch of about 12 at the limit of the eye's resolution (i.e. 47eye-35fluid) and is noticeable as a coloured-fringe-effect or halo when viewing a naked fluorescent tube, or when viewing a brightly lit scene through a device from a side having a significantly lower light level, or viewing a brightly lit object at an acute angle.

As described earlier, it is thought that aromatic content (i.e. aryl substituents) causes significant chromatic dispersion, and in the preceding example the o-xylene component causes the suspending fluid to have an Abbe number less than 39. The applicant found that significant aromatic content in either the solid polymer or the suspending fluid causes undesirable chromatic dispersion. The two solid polymers in tables 1 and 2 to have aromatic content—PC (BPA) and SAN—are the only polymers (in tables 1 and 2) to have an Abbe number less than 39. Similarly, the suspending fluids with a significant aromatic content in tables 3 and 4—toluene, m-xylene, and P(DMS-co-DPhS)—have Abbe numbers less than 39. The pure alkanes in tables 3 and 4 all have Abbe numbers higher than the resolution of the eye (>47). Tetrachloroethylene ($V_d$=38.6) shows that chlorine content can also lower a material's Abbe number. Some further material examples having a significant aromatic content include the fluids toluene ($V_d$=31), isobutylbenzene ($V_d$=35), and tetrahydronaphthalene ($V_d$=34), and the optical polymer polystyrene ($V_d$=29).

Selecting a material in isolation to have an Abbe number greater than 39 is not difficult as shown by the numerous materials that meet this requirement in tables 1 to 4. But in embodiments the non-planar, solid polymer and the suspending fluid cannot be selected in isolation (i.e. without reference to each other) and are selected as a pair of materials having a matching refractive index. In the prior art the refractive index of the suspending fluid is raised to match the solid polymer and this involves adding significant aromatic content to the fluid reducing its Abbe number to less than 39 similar to the previous suspending fluid example of Isopar M+o-xylene. In embodiments the aromatic content of the solid polymer and suspending fluid pair is minimized so that the resultant Abbe number for each material is 39 or greater. To minimize aromatic content—and so chromatic dispersion—the refractive index of the non-planar, solid polymer is reduced to index match a suspending fluid with little or no aromatic content such as alkanes or silicone oils (see table 4). These fluids have a lower refractive index than conventional optical polymers and in embodiments it is proposed that the optical polymer is a crosslinked polysiloxane or a fluorinated polymer to achieve a refractive index match. Advantageously in embodiments adding fluorine content to the elastomer both lowers refractive index and chromatic dispersion (i.e. increases Abbe number).

Abbe number $V_d$ is a useful measure of chromatic dispersion (i.e. wavelength dependence of a material's refractive index) in optical materials and is given by the formula:

$$V_d = (n_D - 1)/(n_F - n_C)$$

where nD, nF and nC are the refractive indices of an optical material at the wavelengths of the Fraunhofer D-, F- and C-spectral lines (i.e. 589.3 nm, 486.1 nm, and 656.3 nm respectively). Alternative Abbe number formulas at different spectral lines give similar results (see 'Abbe Number' entry in www.wikipedia.org). It will be appreciated that any formula using the refractive indices of more than one spectral line in the visible spectrum can be used as an equivalent measure of chromatic dispersion in embodiments and the Abbe number $V_d$ is used herein due to its wide spread use in optical devices. Furthermore, the Abbe number allowable limits for embodiments described herein take into account the photopic response (or luminosity function) of the eye—the human eye is far less sensitive to blue haze than to yellow haze (see 'luminosity function' in www.wikipedia.org). The wavelength dependence of a material's refractive index can be measured directly at spectral lines or it can be quantified by the coefficients in empirical formula such as the Cauchy or Sellmeier equations (see relevant entries in www.wikipedia.org).

Table 5 shows the refractive index of the linear alkane suspending fluid n-dodecane at different spectral lines together with the thermo-optic coefficient for that spectral line. The Abbe number $V_e$ is 59 and is similar to $V_d$. The level of chromatic dispersion shown in FIG. 5 is less than the minimum resolution of the eye due to the eye's luminosity function. A refractive index mismatch of >0.01 between $n_{643.8}$ and $n_{436.1}$ is not apparent given an index match between the suspending fluid and the non-planar, solid polymer at $n_{598.3}$ whereas this level of mismatch between the suspending fluid and the non-planar, solid polymer at $n_{598.3}$ would cause perceivable haze. It can be seen that variations in the magnitude of the thermo-optic coefficient with visible light wavelength are low and that the variations are not of particular significance to chromatic dispersion in embodiments over the operating temperature range. Advantageously, this result also holds for other suitable fluids for use in embodiments including those shown in table 4.

TABLE 5

Chromatic Dispersion and Thermo-Optic Coefficients for n-Dodecane

| Wavelength (nm) | 436.1 (25 °C) | 480.0 (25 °C) | 546.1 (25 °C) | 589.3 (25 °C) | 643.8 (25 °C) | 657.2 (25 °C) |
|---|---|---|---|---|---|---|
| Refractive Index (n) | 1.4287 | 1.4248 | 1.4212 | 1.4194 | 1.4177 | 1.4173 |
| dn/dT ($\times 10^{-4}$/K) | −4.45 | −4.40 | −4.36 | −4.34 | −4.33 | −4.35 |

In another aspect in some embodiments the matched refractive indices of the non-planar, solid polymer (808) and the suspending fluid (820) at 25 degrees Celsius and 589.3 nm of light (i.e. $n_{D25}$) are less than 1.460, and preferably less than 1.445, and more preferably less than 1.434, and most preferably less than 1.426. The low refractive index for the matched pair of materials (i.e. the non-planar, solid polymer and the suspending fluid) is in contrast to the prior art and demonstrates how in embodiments the refractive index of the solid polymer is reduced to index match the low index of typical suspending fluids such as alkanes or siloxanes (see table 4). Fluorinated solid polymer is used in some embodiments as a way to reduce the refractive index of the non-planar solid polymer. The use of a low refractive index suspending fluid and matching solid polymer in embodiments with optically-transparent light states (i.e. light states that transmit specular light with negligible haze) offers a number of advantages including:

- minimizing the solubility of the fluid in the non-planar, solid polymer in contact with the fluid,
- allowing the use of fluorinated polymer (synonymous with partially fluorinated) for the non-planar elements,
- facilitating the use of a siloxane backbone in the solid polymer to enhance the operating temperature range, photo-stability, and thermo-optic coefficient match (see earlier discussion of the thermo-optic coefficient), and,
- minimizing or eliminating the aromatic content of the fluid and solid polymer (see earlier discussion of the chromatic dispersion).

Table 2 shows the refractive indices ($n_{D25}$) of some optically-transparent elastomers suitable for use as the non-planar, solid polymer in embodiments. All have a refractive index of less than 1.46, and all can be cured to be less than 1.426 as described earlier. The elastomer homopolymers polydimethylsiloxane PDMS and polymethyltrifluoropropylsiloxane PMTFPS have the lowest indices at 1.412 and 1.382 respectively (the $n_{D25}$ of PDMS is dependent on the level of crosslinking and the choice of crosslinker chain).

Either polymer can be used as the repeating unit in copolymers with a siloxane that has one or two phenyl substituent groups (i.e. aromatic content), the latter are used to adjust slightly upwards the resulting copolymer's refractive index to match the suspending fluid's (also a low refractive index material) as described earlier. But only fluorinated siloxanes such as PMTFPS and its copolymers have chemical resistance to swelling by the suspending fluids shown in table 4 (as described later).

As an alternative to adding aromatic content to a copolymer (to raise the refractive index), the other siloxane in a copolymer with methyltrifluoropropylsiloxane can incorporate a methylalkylsiloxane; the longer chain aliphatic substituent group increases the refractive index proportional to the additional hydrocarbon content (compared to the methyl group it replaces). Suitable repeat units include methyloctylsiloxane ($n_{D25}$=1.445 for this fraction), methylhexadecylsiloxane ($n_{D25}$ 1.451), and methyltetradecylsiloxane ($n_{D25}$ 1.455). In a similar alternative the other siloxane can have a polymerizable monomethacryloxypropyl substituent replace a methyl group; the added methacrylate functionality both increases the resulting copolymer's refractive index and provides a site for crosslinking (the latter is described later).

Fluorinated siloxanes in the form of methyltrifluoropropylsiloxane-diphenylsiloxane copolymer (i.e. P(MTFPS-co-DPhS)) or methyltrifluoropropylsiloxane-methylphenylsiloxane copolymer (i.e. P(MTFPS-co-MPhS)) are preferred. In the former the mole percentage of the diphenylsiloxane repeat unit (typically less than 10%) in the copolymer can readily be adjusted to match the refractive index of PDMS fluids as shown in table 4. Advantageously in some embodiments the mole percentage of the phenyl groups is sufficiently high to improve low temperature properties (>3%) but sufficiently low (<10%) to avoid affecting mechanical properties. Furthermore, the aromatic content of the non-planar solid polymer is sufficiently low when index matching to PDMS suspending fluid that the resulting Abbe Number is about 45 or more.

The refractive indices of the solid polymer elements and the suspending fluid are matched at the midpoint of the temperature range to have a difference of less than 0.0075, and preferably less than 0.005, and more preferably less than 0.0035, and most preferably less than 0.002. Preferably in embodiments the temperature selected as the reference temperature for refractive index matching (it does not necessarily have to be 25° C.) is at the midpoint of the most-used temperature range for an application or climate. Alternatively, the reference temperature can be the midpoint of the operating temperature range. By matching the thermo-optic coefficients as described earlier the refractive index match (made at the reference temperature) remains within an acceptable range for index match over the operating temperature range.

In another aspect the pairing of the suspending fluid (820) and the non-planar, solid polymer (808) comprises an organosilicone and/or an aliphatic hydrocarbon suspending fluid and a fluorinated, elastomeric, non-planar polymer. The non-planar polymer (808) achieves substantial chemical resistance to swelling by the suspending fluid (820) by using a fluorinated elastomeric material. Swelling is less than 15% over the operating temperature range of the device, and preferably less than 10%, and more preferably less than 5%, and even more preferably less than 2%, and most preferably less than 1%.

In some embodiments an electrophoretic device comprises a first electrode and a second electrode spaced apart from the first electrode, and between the electrodes an electrophoretic cell containing an electrophoretic ink and one or more non-planar solid polymer elements, the ink including charged particles of at least one type suspended in a suspending fluid, and 75% or more by mass of the suspending fluid is an organosilicone and/or an aliphatic hydrocarbon and the solid polymer is a fluorinated elastomeric polymer.

In some embodiments the pairing of the suspending fluid and the non-planar, solid polymer comprises one or more of the organosilicones—polydimethylsiloxane, polydiethylsiloxane, or polymethylalkylsiloxane—or one or more of the aliphatic hydrocarbons—linear, branched, or cyclic alkanes derived from petroleum products—and the solid polymer is a fluorosilicone or fluorosilicone containing copolymer. In some embodiments the fluorosilicone elastomer comprises more than 10% (by mole %) methyltrifluoropropylsiloxane, and preferably more than 20%, and most preferably more than 25%. In some embodiments the fluorosilicone elastomer is a terpolymer incorporating repeat units of methyltrifluoropropylsiloxane, diphenylsiloxane (or methylphenylsiloxane), and dimethylsiloxane.

Table 6 shows the Hansen solubility parameters for the preferred elastomer PMTFPS and its relative-energy-difference (RED) ratio with polysiloxane and alkane suspending fluids. The relevant theory, equations and parameter measurement methods can be found in the book titled 'Hansen Solubility Parameters—A User's Handbook' Charles M. Hansen, 2007, CRC Press. An RED ratio significantly less than 1.0 indicates considerable swelling of the solid polymer by the fluid (i.e. chemical affinity), a ratio of 1.0 indicates than the fluid has marginal solubilizing or swelling ability (boundary affinity), and significantly greater than 1.0 indicates no solubilizing or swelling ability (no chemical affinity). Table 6 shows examples of material pairings suitable for embodiments and their RED ratios all indicate no swelling (no affinity) between the solid polymer and the fluids in equilibrium (i.e. regardless of time). The RED ratio for a pairing of PMTFPS elastomer with PDMS fluid (2 cSt) is 1.33, with PDMS fluid (100 cSt) it is 1.27, and with Isopar M it is also 1.27, and the three RED ratios are significantly greater than 1.0.

TABLE 6

Hansen Solubility Parameters for Pairings Suitable for Embodiments

| | Dispersion (MPa1/2) | Polar (MPa1/2) | Hydrogen-Bonding (MPa1/2) | Interaction Radius | RED (PMTFPS + Fluid) |
|---|---|---|---|---|---|
| Solid Polymer: | | | | | |
| PMTFPS (Elastomer) | 15.9 | 20.1 | 6.9 | 16.8 | — |
| Fluid-Pairings: | | | | | |
| PDMS (2 cSt @ 25 °C) | 12.4 | 0.0 | 0.0 | — | 1.332 |
| PDMS (100 cSt @ 25 °C) | 15.1 | 0.0 | 0.0 | — | 1.269 |
| Isopar M | 16.0 | 0.0 | 0.0 | — | 1.265 |

Advantageously in embodiments the matching of the thermo-optic coefficients (described earlier) also results in the matching of the coefficients of thermal expansion (CTE) as both are related through the Lorentz-Lorenz equation as follows:

$$dn/dT = -f(n)\beta \text{ (where } \beta \text{ is the volume } CTE\text{) and,}$$

$$f(n) = (n^2 - 1)(n^2 + 2)/6n \text{ (where } n \text{ is the refractive index at } n_{D25}\text{)}$$

As a consequence of having matched CTE values for the pair of materials the change in the RED ratio over the operating temperature range is significantly less that if the optical polymers shown in table 1 (i.e. hard polymers) were used. In particular, the polar solubility parameter difference between the PMTFPS elastomer and low-refractive index fluids remains stable over the operating temperature range maintaining no-chemical-affinity between the pairings.

In embodiments that have a fluorinated siloxane elastomer (e.g. PMTFPS repeat units) the $CF_3$ moiety accounts for the large polar solubility parameter and the polymer's greatly enhanced chemical resistance to low-refractive-index fluids. By comparison, PDMS elastomers have a small polar solubility parameter and significant affinity to low-refractive-index fluids. PDMS elastomer has the following Hansen solubility parameters: dispersion=13.8 ($MPa^{1/2}$), polar=5.0 ($MPa^{1/2}$), and hydrogen bonding=1.2 ($MPa^{1/2}$), and an interaction radius of 14.3. The RED value for PDMS elastomer with Isopar M is 0.47, with PDMS fluid (100 cSt) it is 0.40, and with PDMS fluid (2 cSt) it is 0.41. These RED values indicate that the three fluids swell PDMS elastomers at 25° C. and consequently these material pairings cannot be used in embodiments.

In chemical resistance trials to demonstrate the non-swelling of fluorosilicone elastomer by PDMS fluid at high temperature fluorosilicone elastomer FE-271-U was immersed in PDMS oil KF-96-100 cSt (both available from www.shin-etsu.com) for 250 hours at 150° C. The degree of swelling (i.e. volume change) at the end of the test but still at 150° C. was just 0.5%. By comparison silicone elastomer KE-951-U immersed in the same fluid for the same time and temperature swelled by 50%.

Advantageously fluorosilicone elastomeric materials developed for the O-ring/seal industry provide further background on the chemical resistance of elastomers for use as the non-planar, solid polymer in embodiments. Elastomers used in O-rings are loaded with fused silica and/or other dispersed hard fillers and additives and appear translucent (fused silica loading), black (carbon black loading), white (TiO2 loading), or coloured (pigment loading). Consequently, formulations (or kits) created for O-ring/seal applications are heterogeneous and cannot be used for the non-planar polymer of embodiments, the latter are homogeneous (i.e. comprise the same material). Furthermore, the crosslink cure chemistry in O-ring applications is generally a peroxide free-radical catalysed system that creates volatiles as part of curing, in preferred embodiments a platinum-catalysed system is used that creates no volatiles. Fluorosilicone elastomeric O-rings are known as FVMQ or FMQ (see ISO1629 or ASTM D1418). Even though the optical and mechanical properties of fluorosilicone O-rings are dominated by the interaction of their filler materials with the surrounding fluorosilicone polymer, their chemical resistance to fluids is near solely dependent on their fluorosilicone polymer. PMTFPS is generally used in a copolymer with PDMS in O-rings. The chemical resistance demonstrated by FVMQ elastomeric O-rings is a useful guide to the resistance of homogeneous fluorosilicones for use in embodiments.

The chemical resistance of fluorosilicone O-rings to continuous contact with gasoline and other petroleum products have been proven in the automotive and aircraft industries where they have demonstrated the widest operating temperature range for elastomers. ASTM D 2000, 'Standard Classification for Rubber Products in Automotive Applications'—2008, rates fluorosilicone O-rings/seals as having a volume change of less than 10% (i.e. <10% swelling) when immersed in petroleum test oil IRM 903 for 70 hours at 150° C. (the maximum temperature of the test oil). IRM 903 oil is more toxic than the low-refractive-index fluids suitable for embodiments: the oil's refractive index is 1.503, its aromatic content is 14%, its naphthenics content is >40%, and its kinematic viscosity at 38° C. is 32 cSt. The low temperature resistance of fluorosilicone O-rings/seals is rated as non-brittle after 3 minutes at −55° C. (see FK materials in table 6 of ASTM D2000-08).

In a related chemical resistance test of fluorosilicone O-rings for aircraft engines the mole percentage of methyltrifluoropropylsiloxane (MTFPS) to dimethylsiloxane (DMS) in a copolymer was varied to show the influence of copolymer composition on resistance to swelling. Copolymer A had 20:80 (by mole %) MTFPS:DMS, copolymer B had 50:50, and copolymer C had 100:0. Aircraft fuel JP5 (viscosity~1.5 cSt at 40° C.) swelled copolymer A by 28%, copolymer B by 6%, and copolymer C by 16%. Aircraft hydraulic fluid Hydrol swelled copolymer A by 43%, copolymer B by 28%, and copolymer C by 6%. This example shows that in embodiments it is advantageous to trial a range of mole % of PMTFPS when used as a copolymer to identify the optimum level for pairing with a selected suspending fluid (or electrophoretic ink).

In some embodiments an electrophoretic film device is laminated between a pair of adhesive layers (e.g. EVA interlayers) and a pair of glass panes, and each adhesive layer covers substantially the full surface of each pane and bonds an opposing face of the electrophoretic device to a face of a pane, and the electrophoretic glass laminate is a monolith. Advantageously in embodiments, the swelling resistance at high temperature provided by the pair of materials (i.e. the elastomeric, non-planar, solid polymer and the suspending fluid) is compatible with laminating film devices to glass. The interlayer can be polyvinyl butyral (PVB), ethylene-vinyl acetate (EVA) or polyurethane (PU), and advantageously incorporates a UV filtering function that absorbs 99% or more of incident UV light. Preferably, an EVA interlayer is used as these have the lowest maximum processing temperature and excellent adhesion to PET substrates. A vacuum-bag glass laminating process is preferred over an autoclave. Suitable interlayer films for use with the present invention include EVASAFE from Bridgestone Corporation, Japan, and S-LEC EN from Sekisui, Japan. Process guidelines for laminating PET films to glass are available from both suppliers. As part of the glass laminating process an embodiment is subject to a peak temperature of about 105° C. for 10 minutes or more and the material pairings described demonstrate low swelling (near negligible) and no degradation of the electrophoretic cell performance as a consequence of laminating the device to glass.

The following sections further describe the selection of suitable materials for the suspending fluid (820) and the non-planar, solid polymer (808) with the requirement that these materials remain phase-separated in an electrophoretic cell (809) and preserve compatibly (i.e. no chemical affinity) over a wide operating temperature range. This further description is common to the four aspects already described except where narrowed/excluded by an aspect. For convenience herein the four aspects described can be referred to as:

matching thermo-optic coefficients for the pair of materials;

matching chromatic dispersion for the pair of materials;

using a low-refractive index for the matched pair of materials; and using an organosilicone and/or an aliphatic hydrocarbon suspending fluid and a fluorinated, elastomeric, non-planar polymer as the preferred pair of materials (i.e. the preferred pairing solution).

Advantageously, siloxanes and fluorinated siloxanes (i.e. fluorosilicones) have high thermal and oxidative stability, are chemically inert, and have very good ultra-violet resistance resulting in excellent environmental stability. In the sunlight UV and infrared spectrums both materials are transparent apart from the characteristic absorption bands in the near infrared. Siloxanes are used extensively in the building and glazing industries as sealants (filled elastomers—not optically transparent) where they have proven weather-ability and durability over a lifetime measured in tens of years. Similarly, polydimethysiloxanes has been used as an encapsulant in photovoltaic and high-brightness LED applications, in these applications the PDMS elastomer is selected for optical-transparency and demonstrates excellent photo-stability in outdoor environments.

In embodiments charged, black particles translate position in an electrical field and the switching time is quasi-proportional to the suspending fluid's viscosity. In the prior art of electrophoretic displays minimizing the switching time is highly desirable because a display can be continuously updated and consequently viscosity is minimized. But in optically-transparent electrophoretic devices for use in smart glass applications there is not the same imperative to provide the fastest switching time possible and it is more important that the suspending fluid's viscosity (as a proxy for molecular weight) is sufficiently high that at the maximum operating temperature the fluid does not become a solvent for the non-planar, solid polymer in the electrophoretic cell where such fluid is not a solvent at 25° C. Furthermore, the material choice for suspending fluid provides a usable viscosity at low temperature to ensure switching operation.

In embodiments the suspending fluid comprises 75% or more of oligomers or short chain polymers (or copolymers). The remaining suspending fluid can include charge control agents associated with the charged particles, and various optional additives including surfactants, dispersants, and high-molecular-weight dissolved polymer to stabilize the suspension of the charged particles in an electrophoretic ink—these are known in the prior art of electrophoretic inks. The resultant kinematic viscosity of the suspending fluid at 25 degrees Celsius is within the range 3 cSt to 100 cSt, and preferably within the range 5 cSt to 50 cSt, or about twice or more that of a typical electrophoretic display. Furthermore, the resultant kinematic viscosity at 75 degrees Celsius is more than 2 cSt, and preferably more than 3 cSt, and most preferably more than 3.5 cSt to minimize the risk of the suspending fluid becoming a solvent for the non-planar structure even though not a solvent at 25° C. Table 4 shows that the alkane fluids typical of those found in conventional electrophoretic displays have viscosities at 75° C. of about 1.25 cSt or less greatly increasing their solubilizing (and swelling) ability for solid polymer in contact with the fluid in an electrophoretic cell. By contrast PDMS fluids have a wider range of viscosities available and change less with temperature than alkane fluids. In table 4 PDMS fluids with about seven or more repeat units maintain a viscosity greater than 2.0 cSt at 75° C. PDMS fluids can be blended to achieve a desired minimum viscosity at a high temperature and/or a maximum at a low temperature.

The resultant kinematic viscosity in some embodiments at −25 degrees Celsius is less than 350 cSt, and preferably less than 200 cSt, and most preferably less than 125 cSt to ensure switching at very low temperature. Again PDMS fluids show less change in viscosity for low temperature than alkane fluids. In table 4 a PDMS fluid with a viscosity of 5.0 cSt at 25° C. has a viscosity of about 17 cSt at −25° C., by comparison Isopar M has 3.25 cSt and 21 cSt respectively. The linear (or normal) alkanes are generally not suited to low temperature embodiments: n-dodecane in table 3 is a semisolid at −25° C. despite having a viscosity of only 1.84 cSt at 25° C. In another example of limited suitability, the blended alkane (or aliphatic hydrocarbon) 50350 in table 3 goes from being semisolid at −25° C. to 19 cSt at 25° C. and 4 cSt at 75° C. resulting in much poorer suitability than PDMS (n~15) that has a viscosity of 37 cSt at −25° C., 10 cSt at 25° C., and 4 cSt at 75° C. The latter has similar viscosity change with temperature to polydiethylsiloxane (see table 4).

Very high molecular weight polymer added as a minority component to a suspending fluid to improve charged particle suspension can be undermined at elevated temperature due to the reduction in viscosity, or result in unacceptably high viscosity at low temperature. In some embodiments very high molecular weight polydimethylsiloxane, or polydiethylsiloxane, or polymethylalkylsiloxane is added instead of conventional polymer additives as its viscosity change with temperature is minimized. For example, in table 3 P (DMS-co-DPhS) has a similar viscosity change to a corresponding high-molecular-weight hydrocarbon polymer, it goes from 24,800 cSt at −25° C. to 450 cSt at 25° C. and just 75 cSt at 75° C. resulting in much poorer stabilizing ability at 75° C. than for PDMS (n~232) that has a viscosity of 1,650 cSt at −25° C., 500 cSt at 25° C., and 217 cSt at 75° C. (see table 4 for the latter). The maximum number of repeating units of the PDMS fluids shown in table 4 is 846 (for a viscosity of 10,000 cSt at 25° C.) but an embodiment's suspending fluid is not limited in the number of repeating units of a minority additive and advantageously PDMS remains a fluid regardless of the number of repeat units when not crosslinked (or crosslinking is negligible).

Preferably an embodiment's controller (i.e. signal generator) senses an embodiment's face temperature and compensates for temperature during switching with increased waveform duration or voltage amplitude for reduced temperatures and vice-versa. Examples of a controller and drive waveforms that can be used with embodiments are described in the related Irish Patent Application No. S2013/0104 titled "An Electrophoretic Device Having a Transparent Light State" filed on 22 Mar. 2013.

The suspending fluid's viscosity at high and low temperature is related to its boiling point and pour point respectively and these properties are shown in tables 3 and 4. But in embodiments there are requirements of a suspending fluid's boiling point and pour point that are not automatically captured by the viscosity ranges already described. High temperature operation requires a suspending fluid with a low vapour pressure and a boiling point well in excess of the maximum operating temperature. As a suspending fluid is a blend of different components it is important that each component as a pure fluid or material is not volatile at the maximum operating temperature. Conversely, to ensure low temperature operation the pour point of the suspending fluid is well below the minimum operating temperature. The pour point is a guide to the minimum temperature an embodiment can withstand, at that temperature the suspending fluid's viscosity is too high to support switching (i.e. not operational) but otherwise it is safe to expose the fluid in an electrophoretic cell to the pour point temperature.

In some embodiments the suspending fluid has a boiling point at atmospheric pressure of at least twice the device's maximum operating temperature in degrees Celsius, and preferably at least 200 degrees Celsius, and a pour point at least 1.5 times lower than the minimum operating temperature, and preferably at least −30 degrees Celsius (i.e. 243K), and more preferably at least −45 degrees Celsius (i.e. 228K), and most preferably at least −55 degrees Celsius (i.e. 218K). In table 4 PDMS fluids with about 7 or more repeat units ($n \geq 7$) have a boiling point of more than three times the maximum operating temperature. Advantageously PDMS fluids have a pour point of twice (in magnitude) the minimum operating temperature (i.e. −50° C. versus −25° C. respectively) regardless of the number of repeating units (e.g. a PDMS fluid with a viscosity of 1M cSt at 25° C. still has a pour point lower than about −50° C.).

Some fluids, such as linear alkanes, develop nanometre scale wax crystals at low temperature, and in order to avoid these wax crystals causing light scattering their maximum dimension is less than 200 nm at an embodiment's minimum operating temperature. Preferably a suspending fluid is free of crystallization at an embodiment's minimum operating temperature and in this regard the fluid avoids a significant level of linear alkane components.

The service temperature of a fluid (shown in tables 3 and 4) is the usable range for a pure fluid in normal operation as typically recommended (or guided) by the suppliers of that fluid, and is significantly narrower than the range indicated by the pour point to the boiling point. In embodiments the operating temperature range is narrower (i.e. more conservative) than the service temperature of the pure fluids as shown in tables 3 and 4. PDMS fluids with repeat units of three or more (i.e. $n \geq 3$) have a wide service temperature, from −40° C. to 150° C., regardless of the number of repeat units making their use in embodiments preferable to alkane fluids (−40° C. to 130° C.) for wide operating temperature range devices, see table 4.

Polydialkylsiloxane fluids, including with linear and branched substituent groups, are suitable for embodiments and table 4 shows that polydiethylsiloxane at 10 cSt viscosity (25° C.) has similar viscosity change with temperature as PDMS (n=15), and similar service temperature, boiling point, pour point, and dn/dT, the Abbe number is higher by one $V_d$ number (i.e. more favourable) reflecting the increased hydrocarbon content. The latter point can be generalized for embodiments whereby increasing the hydrocarbon content of the siloxane suspending fluid—by increasing the molecular weight of alkyl substituent groups-increases the fluids Abbe number over a corresponding viscosity, PDMS fluid. In some embodiments PDMS is more advantageous than polydiethylsiloxane as it has a lower refractive index: 1.399 versus 1.437. But in other embodiments the larger alkyl substituent groups have another advantage (in addition to the increased Abbe number) as they offer enhanced interaction with a hydrocarbon, charged-particle surface providing superior particle suspension in the suspending fluid. In still other embodiments one or more PDMS fluids are blended with one or more siloxane fluids having larger alkyl substituent groups such as polydiethylsiloxane.

Preferably the suspending fluid does not blend a minority of volatile fluids with a majority of non-volatile fluids to adjust properties. Furthermore, preferably the suspending fluid is distilled or otherwise processed to substantially remove volatile components that have a boiling point less than described earlier. Volatile components are relative, for example, PDMS (n=0 or n=1) can be considered volatile when present in high-repeat-number silicone fluids. Similarly, $C_8H_{18}$ and lower alkanes in $C_{12}H_{26}$ and higher alkanes are volatile. In preparing a suspending fluid for use in embodiments the level of volatile components is preferably reduced to less than 1%, and preferably to less than 0.5%. Additionally, an electrophoretic ink preferably has its water content reduced to a minimum (about 100 ppm or less) and is degassed prior to use in a device. At less than 100 ppm the water content in the suspending fluid has a negligible impact on the fluid's refractive index and dielectric constant.

In embodiments 75% or more of the suspending fluid includes one or more of the following, or copolymers of two of the following, in solution: an aliphatic hydrocarbon (i.e. alkane) compound, an organosilicone compound, a fluorosilicone compound (e.g., fluoroalkylsiloxane), or an organofluorine compound (e.g., fluorocarbon, perfluorocarbon, or perfluoroalkoxy). Preferably the majority (≥75%) of the suspending fluid is a low molecular weight polymer and has repeat units comprising one or more of: dimethylsiloxane, diethylsiloxane, methylalkylsiloxane, dialkylsiloxane, or methylphenylsiloxane. Preferably, this suspending fluid is paired with a fluorosilicone elastomeric, non-planar, solid polymer in the electrophoretic cell. In some embodiments the organosilicone fluid has one or more cyclic siloxane components such as octamethylcyclotetrasiloxane, decamethylcyclopentasiloxane, or dodecamethylcyclohexasiloxane.

The electrical properties of the suspending fluids listed meet the requirements of embodiments, however, the dielectric constant of a fluorosilicone suspending fluid is significantly greater than for the other fluids and consequently is less desirable (as described later). The PDMS fluids shown in table 4 have a dielectric constant at 50 hertz in the range 2.28 to 2.76, and the alkanes in the range 2.0 to 2.1. The volume resistivity of the PDMS fluids is $>1\times10^{12}$ ohm·m and the alkanes are also $>1\times10^{12}$ ohm·m. The breakdown voltage of the PDMS fluids that have a viscosity at 25° C. of <6 cSt is >14V per micron, and for >6 cSt it is >20V per micron. The dielectric loss tangent at 50 hertz for the PDMS fluids is ≤0.0001. The thermal conductivity of PDMS fluids that have a viscosity<50 cSt lies in the range 0.10 to 0.15 W/(m·K), and those ≥50 cSt, 0.16 W/(m·K).

Those embodiments that use a fluorosilicone suspending fluid offer an alternative pairing of fluid and elastomeric, solid polymer. An example of the fluorosilicone fluid PMTFPS is shown in table 3. This is a fluorinated polymeric suspending fluid and can also be described as a fluorinated siloxane suspending fluid. It remains a fluid regardless of the number of repeat units unless crosslinked. With sufficient crosslinking PMTFPS becomes an elastomer (a solid polymer) as shown in table 2. PMTFPS polymeric fluid does not dissolve or appreciably swell PDMS elastomer (see table 2). Its viscosity change with temperature is significantly greater than PDMS fluid having a similar viscosity to it at 25° C. (see tables 3 and 4). Preferably PMTFPS functionality is incorporated as a majority copolymer with a polysiloxane such as polydiphenylsiloxane. The latter's role in the copolymer is to raise the suspending fluid's refractive index from 1.382 (PMTFPS) to about 1.4118 or higher (match to PDMS elastomer). In another example of a fluorosilicone fluid the fluorine is present as a fluoroalkoxy substituent group on a siloxane such as the heptafluoroisopropoxypropyl group.

The fluorosilicone suspending fluid comprises a fluorosilicone homopolymer or fluorosilicone copolymer having at least one pendant group containing a phenyl group and comprises more than 10% (by mole %) methyltrifluoropropylsiloxane, and preferably more than 20%, and most preferably more than 25%. Its paired elastomeric, non-planar polymer in the electrophoretic cell is polymethylalkylsiloxane and preferably polydimethylsiloxane. The suspending fluid is dominated by its polar $CF_3$ (moiety) resulting in a dielectric constant for the fluid at 50 hertz of about 6.5 to 7.0 and consequently is much less favourable than the earlier described pairing of a fluorosilicone elastomer and an organosilicone or aliphatic hydrocarbon suspending fluid. The breakdown voltage of fluorosilicone fluids is about 15 volts per micron, and its volume resistivity is about $1\times10^{13}$ ohm·m.

Those embodiments that use an organofluorine suspending fluid offer another alternative pairing of fluid and elastomeric, solid polymer. Conventional organofluorine compounds on their own are not suitable for embodiments as their refractive index is too low to have the possibility to index match with an appropriate solid polymer in the non-planar structure (e.g., see FC-43 in table 3 and available from www.3m.com). Fluoropolymer elastomers have a suitably low refractive index but cannot be used with an organofluorine fluid as the latter dissolves or swells the elastomer. But with a suitably low fluorine content, or incorporated as a copolymer (again with low overall fluorine content), an organofluorine compound can be used for an embodiment's suspending fluid. As a guide to suitable fluorine content in the form of $CF_3$ (moieties) parallels can be made with the fluorine content of PMTFPS fluid. In this way a suitable organofluorine compound for embodiments that refractive index matches a PDMS elastomeric solid polymer can be realized. Similar to PMTFPS, the organofluorine compound does not dissolve or swell a PDMS elastomer.

As described in the first aspect earlier, to obtain a thermo-optic coefficient match between the suspending fluid and the non-planar, solid polymer the latter is selected to be an elastomer with a glass transition temperature (i.e. $T_g$) preferably less than the minimum operating temperature. In embodiments the elastomeric, non-planar, solid polymer relies on flexible linkages in its backbone to achieve a low glass transition temperature $T_g$. The elastomer's backbone includes one or more of the following linkages: ether (i.e. R—O—R'), siloxane (i.e. Si—O—Si), fluoroether (i.e. $CF_2$—O—$CF_2$), thioether (i.e. R—S—R'), methylene (i.e. $CH_2$), difluoromethylene (i.e. $CF_2$), or phosphazene (i.e. N═P). A siloxane backbone is preferred because it has a very low $T_g$: PDMS elastomer has a $T_g$ of less than −100° C. and fluorinated-siloxane elastomer such as PMTFPS has a $T_g$ of less than −65° C. despite its fluorine content (see table 2).

In embodiments the optically-transparent elastomer (i.e. the non-planar, solid polymer) has 3% or less haze in its bulk at a thickness of 50 microns (i.e. about a maximum z-axis dimension in an electrophoretic cell), and preferably less than 2%, and most preferably less than 1%. In a related property it follows that the solid polymer has low birefringence with a value of less than 0.005, and preferably less than 0.001, and most preferably less than 0.0005. Advantageously very low haze and birefringence (i.e. <1% and <0.0005 respectively) can be achieved by using an amorphous elastomer well above its glass transition temperature, particularly elastomers that have a siloxane backbone such as those shown in table 2.

The optically-transparent, solid polymer is either amorphous (preferred) or has nanometre-scale, crystalline segments in otherwise amorphous polymer and is semi-crystalline. In the latter case the maximum dimension (or axis) of the nanometre-scale crystalline segments is restricted to be significantly shorter than the wavelength of blue light to avoid refracting visible light. In embodiments that have semi-crystalline polymer at least 50%, and preferably at least 85%, of crystalline segments have a maximum dimension of 200 nm, and preferably a maximum of 125 nm, and more preferably a maximum of 85 nm, and most preferably a maximum of 65 nm.

As the non-planar solid polymer is an elastomer it has viscoelastic properties for temperatures greater than its glass transition temperature (and preferably over the operating temperature range of the device), and these viscoelastic properties are defined by a Young's Modulus (i.e. E) of less than 50 MPa and a hardness (Shore A) of less than 90. The difference in viscoelastic properties for optical polymers not suited to embodiments and optically-transparent elastomers for use in embodiments can easily be seen by comparing values in tables 1 and 2. All the polymers in table 1 have a Young's Modulus (E) of 1,400 MPa or more whereas those in table 2 are 3 MPa or less. A corresponding difference can be seen in the hardness of the solid polymers: those in table 1 all have values exceeding the range available with the Shore A scale (i.e. they are in the Shore D scale) whereas all those in table 2 are in Shore A.

Advantageously, and as a consequence of the viscoelastic properties of the non-planar polymer in the electrophoretic cell, the electrophoretic cell in embodiments is flexible over the operating temperature range. The resulting device is also flexible when the cell is sandwiched between flexible substrates such as ITO coated PET sheets. Maintaining flexibility in the electrophoretic cell is important for embodiments that operate-in and withstand very low temperatures. For example, an embodiment incorporated into a car's roof or a building's door can be exposed to very low temperatures in extreme weather and yet maintains a degree of flexure to avoid shattering or cracking when subjected to mechanical shock and wind. Furthermore, in some embodiments the electrophoretic cell is bonded to an electrode-coated substrate that in turn is bonded to glass. The coefficient of thermal expansion (i.e. CTE) of each part is significantly different and will result in shear stresses unless the Young's Modulus is maintained low at the interface between disparate parts. The values shown in table 2 for the non-planar solid polymer are sufficiently low to avoid destructive stress within the electrophoretic device when cycling between temperature extremes.

In embodiments that have an amorphous elastomer the viscoelastic properties are dependent on the density of covalent (i.e. chemical) crosslinks that crosslink molecules ranging from high-molecular-weight monomers to oligomer to polymer macromolecules (comprising multiple monomer units), and as a consequence the non-planar polymer in these embodiments is thermoset-rubber. Alternatively, in semi-crystalline elastomers the viscoelastic properties are dependent on the density of physical crosslinks provided by hard crystalline segments dispersed in soft amorphous polymer, and as a consequence the non-planar polymer is thermoplastic-rubber.

A further advantage of the optically-transparent elastomers suitable for embodiments as shown in table 2 over the optical polymers shown in table 1 is that the former have a maximum continuous-use service temperature (i.e. $T_s$) of about twice the maximum operating temperature of embodiments. By contrast, many of the optical polymers in table 1 have $T_s$ of less than the required operating temperature and could suffer fatal thermal degradation if subjected to prolonged use in the 90 to 100° C. range. In embodiments the elastomeric, non-planar, solid polymer element has a maximum continuous use temperature (i.e. $T_s$ or service temperature) significantly greater than the maximum operating temperature of the device, and preferably greater than 125 degrees Celsius, more preferably greater than 150 degrees Celsius, and most preferably greater than 175 degrees Celsius.

In embodiments the elastomeric, non-planar, solid polymer element includes one of the following polymers, or copolymers or terpolymers that use one or more of the following: a polysiloxane, a fluoroalkane polymer, a perfluoroether polymer, a fluorosilicone polymer, a fluorinated (meth)acrylate polymer, a fluorosilicone (meth)acrylate polymer, a fluorinated polyolefin polymer, a fluorinated aliphatic polycarbonate, or a fluorinated polyurethane. Copolymers include a fluorosilicone-co-siloxane copolymer, a fluorosilicone-co-fluoroalkane copolymer, or a fluoroether-co-siloxane copolymer.

In embodiments that have a fluorinated (synonymous with partially fluorinated herein) elastomer, its polymer has at least one pendant group containing an $CF_3$ (moiety). The $CF_3$ (moiety) is particularly effective in resisting swelling by polysiloxane and alkane fluids, significantly more so than the corresponding fluorine content present as $CF_2$. In some embodiments the fluorinated polymer has a repeat unit of the type fluoroalkylsiloxane including (but not limited to) methyltrifluoropropylsiloxane (MTFPS), methylpentafluorobutylsiloxane, methylheptafluoropentylsiloxane, or methylnonafluorohexylsiloxane. Alternatively, the fluorinated polymer has a repeat unit of the type fluoroalkoxyalkylsiloxane including (but not limited to) heptafluoroisopropoxypropyl tetramethylcyclotrisiloxane.

The electrical properties of fluoroalkylsiloxanes elastomers are suitable for use in embodiments. PMTFPS elastomers have a dielectric constant at 50 hertz in the range 6.75 to 7.35. Advantageously, fluorinated siloxane elastomers will always have a greater dielectric constant than silicone/PDMS fluids and aliphatic fluids which has the effect of increasing the electrical field strength in the fluid (and cell) available to move charged particles in the electrophoretic ink. The converse relationship, fluorosilicone suspending fluid and silicone/PDMS elastomer has the effect of reducing the electrical field strength available to move charged particles in the ink and so is less desirable. The volume resistivity of PMTFPS elastomer is $>1\times10^{12}$ ohm·m, and the breakdown voltage is about 13V per micron. The dielectric loss tangent at 50 hertz is about 0.04.

In embodiments the elastomeric, non-planar, solid polymer can be cured by thermal-curing or radiation-curing, or have multiple cure functional groups including thermal-curing and photo-curing groups. In the latter case the photo-curing groups can be in the minority and used to achieve rapid initial curing that provides initial minimum mechanical properties while the thermal-curing groups are in the majority and used to achieve a high level of polymerization of available sites and uniform properties.

In embodiments the crosslink cure chemistry in the elastomeric, non-planar, solid polymer with a siloxane backbone includes one of: platinum-catalysed hydrosilylation addition system, peroxide free-radical catalysed system, tin or zinc catalysed condensation system, thiol-ene free-radical addition system, or ultra-violet cured methacrylate and acrylate functional polymers (i.e. acryloxypropyl or methacryloxypropyl functional siloxanes). The platinum-catalysed hydrosilylation addition cure is preferred as no byproducts are formed during curing (i.e. no volatiles from curing that could migrate into the electrophoretic ink over time). The platinum-cure provides the cured polymer with the best mechanical and optical performance (also the most repeatable). The resulting thermo-optic coefficient of the elastomeric, solid polymer can be finely varied by controlling the density or level of crosslinks. In a catalysed curing system the level of the catalyst, or more importantly its release rate from its complexing fluid, can be used to control the cure profile. Advantageously the crosslink cure chemistry of fluorinated siloxanes such as PMTFPS and those listed earlier is the same as for non-fluorinated siloxanes such as polydimethylsiloxane allowing materials and reaction methods for the latter to be applied to the former, and copolymers and crosslinked elastomers to incorporate repeat units of both.

An additional advantage is that there is a well-developed range of materials to add reaction functionality and product functionality to polysiloxanes and such functions can be optionally incorporated into fluorosilicone copolymers in embodiments using the other (i.e. non fluorinated) siloxane repeat unit. For example, silicone reactivity and products that can be introduced include: vinyl (peroxide activated cure), vinyl+hydride (vinyl-addition, hydrosilylation, platinum-catalysed cure), hydride+silanol (metal salt cure), silanol (moisture cure, RTV-1-part), silanol+alkoxy/polymeric alkoxide (condensation cure RTV-2-part), alkoxy/polymeric alkoxide (ceramics and ormosil products), amine (polyureas, polyimides product), amine+epoxy (epoxy addition cure), epoxy (cationic UV cure), carbinol (polyester or polyurethane product), (meth)acrylate (free-radical cure including thermal and UV initiated), mercapto (thiol-ene cure including thermal and UV initiated), acetoxy/chlorine/dimethamine (moisture cure), polymeric alkoxide (silicon dioxide product), silsesquioxanes (silicon dioxide product), polysilazanes (silicon nitride product), and polysilanes (silicon carbide product).

In some embodiments the siloxane-backbone elastomer has a prepolymer in the form of a two-part, liquid kit comprising a base (i.e. platinum catalyst and vinyl chain) component in one part and a curing (i.e. hydride functional crosslinker chain and optionally additional vinyl) component in the other part. The two parts (i.e. base and curing components) are generally mixed by compounding and methods include: sigma-blade mixers, planetary mixers, or two-roll mills. An embodiment's thermo-optic coefficient can be varied by varying the ratio of the two parts in the resulting prepolymer and curing to an elastomeric, solid polymer.

The platinum-catalysed hydrosilylation addition cure (preferred) allows curing of the fluorinated-siloxane elastomer of embodiments below 50° C. (referred to as room-temperature-vulcanizing RTV), curing between 50° C. and 130° C. (referred to as low temperature vulcanizing LTV, or above 130° C. (high temperature vulcanizing HTV).

In a two-part liquid kit example, vinyl-terminated polymethyltrifluoropropylsiloxane, or its copolymers such as polymethyltrifluoropropylsiloxane-co-dimethylsiloxane, polymethyltrifluoropropylsiloxane-co-methylphenylsiloxane, or polymethyltrifluoropropylsiloxane-co-diphenylsiloxane, having viscosities from 200 cSt to 60,000 cSt form the polymer chains of the base part, and these are distilled (or otherwise) to remove volatiles as previously described for polymeric fluids. For example, the fluorinated polymer chain of the base part can be vinyl-terminated polymethyltrifluoropropylsiloxane-co-dimethylsiloxane with 35% to 45% mole percent MTFPS (CAS number 68951-98-4).

In the curing part of the kit example, the crosslinking polymer chain provides three or more hydride groups and can be a methylhydrosiloxane-dimethylsiloxane copolymer with 15-50 mole % of methylhydrosiloxane repeat units. In some embodiments the crosslinking polymer incorporates phenyl groups such as methylhydrosiloxane-methylphenylsiloxane copolymer. A crosslinking copolymer can be hydride terminated and in this case has at least one hydride repeat unit. Preferably, the hydride functional crosslinker is a fluorinated high-molecular-weight monomer, oligomer, or polymer chain and incorporates one or more $CF_3$ moieties. For example, the fluorinated crosslinker can be trifluoropropyltris(dimethylsiloxy) silane (CAS number 3410-32-0). In other examples, the fluorinated crosslinker can be a copolymer incorporating methyltrifluoropropylsiloxane repeat units such as copolymer methylhydrosiloxane-methyltrifluoropropylsiloxane with 15-50 mole % of methylhydrosiloxane.

The platinum catalyst is a complex selected to dissolve in the reaction medium creating a homogeneous fluid. Examples include platinium(0)+divinylsiloxane complex, platinium(0)+cyclic divinylsiloxane complex, and platinium (+2)+octanol complex. For example, the platinum catalyst can be divinyltetramethyldisiloxane complex (CAS number 68478-92-2) or cyclovinylmethylsiloxane complex (CAS number 68585-32-0). The platinum catalyst is generally in the range 1-30 ppm based on the platinum concentration (not to be confused with the complex concentration) in the total formulation mass.

The result of curing the mixture of base and curing components (of a two-part kit) is ethyl bridges between the former vinyl groups (of the base) and former hydride groups (of the curing component) on their respective chains. In this way ethyl bridges are the crosslinks and increasing ethyl bridges in the resulting non-planar solid polymer of embodiments increases the crosslink density. In principle, molar equivalents of hydrides (in the crosslinker or curing component) react with vinyls (in the polymer chains or base component) but in practice there is usually a molar excess of hydrides over vinyls (e.g., 1.5:1.0) to achieve optimal physical characteristics. The ratio of the two can depend on the chain length of the vinyl terminated fluorosilicone (or fluorosilicone copolymer) and the molar percent of hydride in the crosslinker. In some embodiments the vinyl-terminated fluorosilicone chain can incorporate vinyl substituent groups to increase cure sites and crosslinks. Embodiments can use the fluorosilicone chain length (vinyl terminated), and/or vinyl substituent groups, and/or the molar percent hydride in the crosslinker, and/or the molecular weight of the crosslinker, to control or select the density of crosslinks.

A wide variety of functionalities can be introduced into an embodiment's prepolymers for the non-planar solid polymer via homogeneous platinum catalysed hydrosilations. Availability of suitable terminal alkene functionalities or hydride functionalities is the only requirement. For example, an embodiment's fluorosilicone elastomer can have the following functionalities introduced as part of (platinum-catalysed) curing using commercially available starting materials: hydrocarbons including alkyl or aryl groups, epoxy groups, nitrile/cyano groups, amine groups, ester groups, ether groups, or additional fluorinated groups. This allows the properties of the non-planar solid polymer to be fine-tuned including: the bulk polymer properties, the properties affecting the interaction of the solid polymer with the electrophoretic ink and the ink's different components, and the peel adhesion of the solid polymer to an electrode-coated substrate (e.g., ITO-coated PET). In some embodiments the mechanical strength is increased and the optical properties finely varied by incorporating vinyl Q resins or hydride Q resins into the polymer resins or monomers (i.e. prepolymers for the non-planar solid polymer).

In some embodiments functional silanes are used to prime the electrode-coated substrate to enhance the peel adhesion (i.e. bond strength) of the fluorosilicone elastomeric, non-planar, solid polymer to the substrate. Silanes possess a hydrolytically sensitive group that can react with inorganic substrates such as indium tin oxide (ITO) coated PET substrates to form stable covalent bonds and possess a second reactive group (e.g., vinyl or hydride group) that can subsequently form covalent bonds with the fluorosilicone elastomer as it is cured. The ITO surface is hydrolytically stable and tends to have sufficient hydroxyl functionality to allow coupling under the same conditions applied to siliceous substrates. The second reactive group participates in the platinum catalysed addition cure to couple the non-planar solid polymer to primed substrates it comes in contact with. The reactive silanes are usually added as trialkoxy silanes and, in the presence of water and a condensation catalyst, form a priming polymeric surface. In some embodiments the silanes and the condensation catalysts form a very thin, optically transparent, planar polymer layer on the surface of the substrate. The layer can be referred to as a monolayer deposition. Advantageously in embodiments the primers commercially developed for use with vinyl addition polysiloxanes can equally be used with the preferred fluorinated siloxanes described herein and include allyltrimethoxysilane, methacryloxypropyltrimethoxysilane, and polyvinylmethoxysiloxane (these materials are available from a number of suppliers including www.gelest.com).

Suitable basic materials and reactive silicones, reactive fluorosilicones, reactive copolymers, and platinum catalyst complexes are commercially available from a number of sources including www.dowcorning.com, www.shin-etsu.com, www.momentive.com, www.gelest.com and www.unitedchem.com. These can be formulated and blended to fulfil the described requirements and make prepolymer fluids for an embodiment's elastomeric, non-planar, solid polymer.

In some embodiments the elastomer prepolymers (e.g. a two-part kit) and the suspending fluid (or electrophoretic ink) are lot-matched to ensure a refractive index match at a reference temperature (e.g., 25° C.). This can be done by taking a representative sample of both materials (i.e. prepolymers and suspending fluid) and measuring the optical properties while adjusting the suspending fluid if necessary to fine tune its refractive index match. In this case the index match is to the cured elastomer samples that are representative of the cured elastomer in a device for that lot (i.e. quantity or batch) of material. In alternative embodiments the cured, elastomeric, non-planar, solid polymer is measured after curing in a device, batch of devices, or a roll of device film and the suspending fluid's refractive index is fine-tuned by adding lower or higher component fluids on a lot basis for those devices. As a further alternative the refractive index of a lot or batch of suspending fluid (or electrophoretic ink) can be measured and the elastomer prepolymer components adjusted accordingly to index match the fluid (of that lot) once cured. Furthermore, the thermo-optic coefficient of a lot can be finely matched by adjusting the crosslink density (or level) of the elastomer to match the value of a representative sample of a suspending fluid lot (i.e. electrophoretic ink lot).

As described earlier, preferably an electrophoretic ink has its water content reduced to a minimum (about 100 ppm or less) and is degassed prior to use in a device. This also applies to the elastomer's prepolymers. After curing, a non-planar polymer exposed to the ambient air can quickly absorb moisture increasing its water content to 250 ppm or more. It is preferable to avoid or reduce moisture content in the solid polymer to less than about 100 ppm to have a negligible impact on the polymer's refractive index and dielectric constant, and related electrical properties including volume resistivity and breakdown voltage. It will be appreciated that in production it is an advantage to control the water and dissolved gas content of the electrophoretic ink and the non-planar solid polymer, preferable reducing both to negligible levels, to achieve repeatable refractive index match (to 0.001 or less) with lot matched materials.

FIGS. 1A and 1B show embodiment 101 in two views: one view shows a cross section of the embodiment's electrophoretic cell 809, and the other view is of a face of the embodiment and can be a front or rear face. The cross sectional views represent a diagonal cross section of the face view. FIG. 1A shows the first light state and 2B shows the second light state.

Device 101 has an electrophoretic ink 830 in an electrophoretic cell 809. The latter is indicated by an arrow and includes all of the elements sandwiched between the top and bottom electrodes 60. Ink 830 has charged particles 11 in a transparent, isotropic suspending fluid 820 that is subject to the requirements already described. The charged particles 11 have a negative charge and appear black (in embodiments particles can be positively or negatively charged). Movement of charged particles 11 in the z-axis is limited by the inner surface of the top electrode 60, or insulator layer 95 if present, and the surface of polymer 815 indicated by level or plane 1003 in exploded view 1100.

In device 101 protrusions are formed by optically-transparent polymer balls (i.e. microspheres or micro particles) 802 that are near monodisperse and account for >90% of the balls, and polymer balls 803 that are monodisperse and account for the remaining balls. Polymer balls 803 act as cell-gap spacers by setting the thickness of the cell 809 (together with the thickness of an optical clear adhesive layer 45). Polymer balls 803 also ensure that electrophoretic ink 830 is free to surround or engulf polymer balls 802 in the electrophoretic ink layer 810 and that particles 11 can spread over polymer balls 802 unobstructed in the first light state.

Polymer balls 802 and 803 project into the electrophoretic ink 830's volume and partially fill electrophoretic ink layer 810 that otherwise indicates the volume filled with electrophoretic ink 830. The polymer element 808 indicates a non-planar structure bonded to an optical-clear-adhesive (OCA) 45 and adjacent the bottom electrode 60 within cell 809. Polymer 815 fills the space between polymer balls 2 and 3 (i.e. the interstices) and the plane of its interface surface with electrophoretic ink 830 is indicated by 1003. In the face view of FIG. 1B polymer balls 802 and 803 are shown arranged tightly in a monolayer and are described as having random close packing.

Electrophoretic cell 809 contains the following two optional elements: optical clear adhesive (OCA) layer 45 and insulating layer 95. The OCA 45 forms a strong bond with an electrode 60 on one side and the non-planar, solid polymer 808 on the other side, see exploded view 1100 in FIG. 1B. The non-planar, solid polymer 808 comprises polymer microspheres 802, polymer cell gap spacers 803, polymer cell walls 835, and solid polymer 815. These different parts of the non-planar, solid polymer 808 are each non-planar elements in electrophoretic cell 809 and are subject to the requirements already described the same as when polymer 808 is a single continuous polymer (i.e. not comprising discrete polymer elements, but rather, formed contemporaneously).

The electrophoretic cell 809 is sandwiched between electrodes 60 and in turn between transparent substrates 90. The substrates 90 can be any suitable transparent sheet material such as glass or polymer (e.g., PET) and can be rigid or flexible. Electrodes 60 are any suitable transparent conductor (e.g., ITO) having a sheet resistivity sufficiently low (e.g., 70 ohm·cms) to apply driving waveforms without significant signal distortion. Insulating layer 95 is optional and can be any suitable transparent dielectric such as a polymer layer, an adhesive layer, or a silicon oxide layer (i.e. SiOx). It prevents electrical contact between electrophoretic ink 830 and the electrode 60. Embodiments are electrophoretic film devices when the electrodes are transparent and coated onto a pair of flexible substrates.

FIGS. 1A and 1B show polymer walls 835, and these walls define a cavity or volume 80 (see the face-view of FIG. 1B) that divides electrophoretic ink 830 into discrete or semi discrete volumes or regions within electrophoretic cell 809. A semi discrete volume refers to when neighbouring cavity walls 835 have interpenetrating regions (i.e. holes) allowing ink 830 from one to mix with ink 830 from another. The cross sectional views show walls 835 as predominantly vertical (i.e. in the z-axis of cell 809) and extending from the surface of polymer balls 802 and 803 to the insulator layer 95, or top electrode 60 if the insulator is not present. The walls 835 serve three purposes: the first is to divide the electrophoretic ink 830 into discrete or semi discrete volumes to enhance the stability of the ink 830 over time as is known in the prior art of electrophoretic display devices; the second is to provide a solid structure for the cell 809 that spans the substrates, and the third is to effectively self-seal electrophoretic ink 830 in an electrophoretic cell 809. The polymer walls 835 are formed by a polymer induced phase separation process (known as PIPS in the prior art). In an alternative embodiment a photolithographic process is used to form walls/ribs 835 and cavities 80.

FIG. 1A shows embodiment 101 in the first light state and represents a maximum spreading or distribution of charged particles 11 in a plane adjacent the top electrode. Negatively charged black particles 11 are near uniformly spread planar with the top electrode 60 in response to an electrical field that establishes a positive potential between the top and bottom electrodes 60. Light ray 1405 incident on cell 809 is strongly absorbed by particles 11 and a front face of embodiment 101 appears black (see the face view in FIG. 1A).

FIG. 1B shows embodiment 101 in a second light state and represents a maximum concentrating of charged particles 11 on the surface of (or ink interface with) non-planar structure 808. Negatively charged black particles 11 are concentrated in the space (the interstices) between polymer balls 802 and 803 in response to an electrical field that establishes a negative potential between the top (i.e. adjacent insulating layer 95) and bottom (i.e. adjacent OCA 45) electrodes 60. Each polymer ball 802 or 803 defines an aperture 1006 that is substantially free of particles 11, is transparent to specular light, and provides visual access to objects lying in view behind embodiment 101. Light ray 1406 incident on the cell 809 is transmitted through an aperture 1006 defined by a polymer ball 802 and exits the cell 809 substantially free of attenuation or light scattering.

In embodiment 101 preferably the maximum separation between neighbouring polymer balls 802 at their equator plane 1003 (i.e. the space that concentrated particles 11 occupy in the second light state) does not exceed the minimum resolution of a typical viewer's eye at a given viewing distance to avoid a viewer being able to resolve such an area as a black spec. or optical defect. In embodiment 101 light states have a perceivable black tint (i.e. when an electrophoretic ink has black charged particles). A viewer's perception of tint is one of a uniform tinting due to the micron scale, discrete distribution, and dense distribution of apertures 1006 (defined by polymer balls 802) in surrounding contiguous black space (i.e. particles 11 in their concentrated state). The appearance of the tint in the second light state is comparable to the black tint in the windshield of a vehicle having tinted glass.

In the description of embodiment 101 apertures 1006 were described as being largely free of particles 11. More generally, an aperture 1006 refers to a discrete area having a low density of particles 11 so that significantly more light is transmitted in such an aperture 1006 (particularly in intermediate light states) than in surrounding areas having a higher density of particles 11 and corresponding to particles in the concentrated state. In addition, the edge of an aperture 1006 may not be a sharp step from one level of particle density to another, rather particle density can decline with a gradient or slope from a high density in a particle concentrated area to a low density in the centre of an aperture. Such considerations arise because the response of charged particles in an electrical field is dependent on a number of factors and is not necessarily uniform. For example, particles 11 can have different charge mobilities leading them to move with different velocities in an electrical field.

In some embodiments a device is incorporated as part of an insulated glass unit (IGU) which has a sealed cavity between an inner pane and an outer pane, and one of the inner or outer panes incorporates the electrophoretic film device as either a glass laminate or an applied film (i.e. a film device applied to a pane using a pressure-sensitive-adhesive). In use, some embodiments are mounted in a frame that defines an opening and function as an electro-active window (synonymous with smart glass).

In some embodiments the electrophoretic laminate can comprise the electrophoretic film device applied to a glass laminate. In this case the glass laminate has a safety glass construction (e.g., glass pane+PVB interlayer+glass pane) and the electrophoretic film device is applied to the safety glass using a suitable adhesive layer such as an optically-clear pressure sensitive adhesive (PSA). The glass laminate fulfils the safety glass requirement and the electrophoretic film device provides electronically-variable light transmittance through its light states.

Absorbed solar energy in strong sunlight can cause heat to build-up and glass panes laminated to the electrophoretic film device (and subject to strong sunlight) are preferably treated to make them more resilient to thermal shock using one of the following processes: heat strengthening, chemical toughening, or thermal toughening. Furthermore, a risk of spontaneous breakage of glass panes due to thermal stress can be greatly reduced or eliminated by subjecting panes that are one of heat-strengthened, chemically-toughened, or thermally-toughened, to a heat soak test or treatment. In this case a process of elimination identifies good panes for use as panes in the electrophoretic laminate.

In some embodiments heat build-up, caused by charged particles absorbing sunlight energy, is about halved. The device's electrophoretic ink uses wavelength-selective charged particles that substantially transmit or reflect the sunlight infrared spectrum (when compared to charged particles that absorb all bands) and minimizes absorption of the sunlight infrared spectrum (over half of the sunlight energy). Advantageously use of wavelength-selective charged particles reduces the peak operating temperature of embodiments and reduces the thermal stress placed on laminated glass panes.

Embodiments described herein are suitable for a range of applications involving exposure to outdoor temperatures and sunlight. Applications include use as a light attenuator in a smart glass, use as a see-through display, or use as a sunlight-readable, reflective display. By controlling light transmittance in windows, glass facades or roof systems, functions including see-through (i.e. transparent), privacy (opaque), electronically-variable tinting or dimming, or black-out can be provided. In display devices functionality can be extended into new areas such as providing see-through (i.e. transparent) displays and providing large-format, sunlight-readable, reflective displays for outdoor applications including billboards and public signage.

Those skilled in the art will recognize improvements and modifications to the preferred embodiments of the present disclosure. All such improvements and modifications are considered within the scope of the concepts disclosed herein and the claims that follow.

The invention claimed is:

1. An electrophoretic device comprising a first electrode and a second electrode spaced apart from said first electrode and between said electrodes an electrophoretic cell containing wavelength-selective charged particles that substantially transmit or reflect the sunlight infrared spectrum, the wavelength-selective particles being suspended in an optically-transparent suspending fluid, and one or more optically-transparent, non-planar, solid polymer elements, the refractive indices of said solid polymer elements and said suspending fluid being matched to have a difference of less than 0.0075, and for half or more of the operating temperature range of said device, the thermo-optic coefficients of the solid polymer elements and the suspending fluid being matched to have an arithmetic-mean difference of less than 0.0002/K in magnitude.

2. An electrophoretic device of claim 1, wherein said wavelength-selective charged particles are responsive to an electric field applied to said electrophoretic device to move between: a first extreme light state in which wavelength-selective charged particles are maximally spread within said across the electrophoretic cell to lie in the path of sunlight through the electrophoretic cell and to strongly reflect light incident on the electrophoretic cell, and a second extreme light state in which said wavelength-selective charged particles are maximally concentrated within the electrophoretic cell to remove them from the path of sunlight through the electrophoretic cell and to substantially transmit light through the electrophoretic cell.

3. An electrophoretic device comprising a first electrode and a second electrode spaced apart from said first electrode and between said electrodes an electrophoretic cell containing wavelength-selective charged particles that substantially transmit or reflect the sunlight infrared spectrum, the wavelength-selective particles being suspended in an optically-transparent suspending fluid, and one or more optically-transparent, non-planar, solid polymer elements, the refractive indices of said solid polymer elements and said suspending fluid being matched to have a difference of less than 0.0075, wherein the matched refractive indices at 25 degrees Celsius and 589.3 nm of light are less than 1.460.

4. An electrophoretic device of claim 3, wherein said wavelength-selective charged particles are responsive to an electric field applied to said electrophoretic device to move between: a first extreme light state in which wavelength-selective charged particles are maximally spread within said across the electrophoretic cell to lie in the path of sunlight through the electrophoretic cell and to strongly reflect light incident on the electrophoretic cell, and a second extreme light state in which said wavelength-selective charged particles are maximally concentrated within the electrophoretic cell to remove them from the path of sunlight through the electrophoretic cell and to substantially transmit light through the electrophoretic cell.

5. An electrophoretic device comprising a first electrode and a second electrode spaced apart from said first electrode and between said electrodes an electrophoretic cell containing wavelength-selective charged particles that substantially transmit or reflect the sunlight infrared spectrum, the wavelength-selective particles being suspended in an optically-transparent suspending fluid, and one or more optically-transparent, non-planar, solid polymer elements, wherein 75% or more by mass of said optically-transparent suspending fluid is an organosilicone or an aliphatic hydrocarbon, and said solid polymer element comprises a fluorinated elastomeric polymer.

6. An electrophoretic device of claim 5, wherein said wavelength-selective charged particles are responsive to an electric field applied to said electrophoretic device to move between: a first extreme light state in which wavelength-selective charged particles are maximally spread within said across the electrophoretic cell to lie in the path of sunlight through the electrophoretic cell and to strongly reflect light incident on the electrophoretic cell, and a second extreme light state in which said wavelength-selective charged particles are maximally concentrated within the electrophoretic cell to remove them from the path of sunlight through the electrophoretic cell and to substantially transmit light through the electrophoretic cell.

* * * * *